United States Patent
Hamada et al.

[11] Patent Number: 5,090,009
[45] Date of Patent: Feb. 18, 1992

[54] OPTICAL INFORMATION RECORDING MEDIUM

[75] Inventors: Emiko Hamada; Yuji Arai; Yuaki Shin; Takashi Ishiguro, all of Tokyo, Japan

[73] Assignee: Taiyo Yuden Co., Ltd., Tokyo, Japan

[21] Appl. No.: 340,528

[22] Filed: Apr. 14, 1989

[30] Foreign Application Priority Data

| Jul. 30, 1988 | [JP] | Japan | 63-191714 |
|---|---|---|---|
| Aug. 29, 1988 | [JP] | Japan | 63-214470 |
| Sep. 22, 1988 | [JP] | Japan | 63-238456 |
| Sep. 24, 1988 | [JP] | Japan | 63-239163 |
| Sep. 24, 1988 | [JP] | Japan | 63-239164 |
| Sep. 24, 1988 | [JP] | Japan | 63-239166 |
| Sep. 24, 1988 | [JP] | Japan | 63-239167 |

[51] Int. Cl.$^5$ .................................................. G11B 7/24
[52] U.S. Cl. .................................. 369/284; 369/275.4
[58] Field of Search ............... 369/275, 283, 284, 288, 369/100, 13, 275

[56] References Cited

U.S. PATENT DOCUMENTS

| 4,097,895 | 6/1978 | Spong | 358/128 |
|---|---|---|---|
| 4,270,132 | 5/1981 | Bell | 369/284 X |
| 4,315,269 | 2/1982 | Bloom et al. | |
| 4,330,883 | 5/1982 | Ohta et al. | 369/100 |
| 4,360,908 | 11/1982 | Howe et al. | |
| 4,398,203 | 8/1983 | Cornet | |
| 4,404,656 | 9/1983 | Cornet | |
| 4,405,994 | 9/1983 | Cornet et al. | |
| 4,577,291 | 3/1986 | Cornet | |
| 4,577,306 | 3/1986 | Howe et al. | 369/286 X |
| 4,578,322 | 3/1986 | Sawamura et al. | 369/286 X |
| 4,586,165 | 4/1986 | Cornet et al. | |
| 4,711,798 | 12/1987 | Ueda et al. | 369/284 X |
| 4,731,755 | 3/1988 | Bjorklund et al. | 365/120 X |
| 4,737,444 | 4/1988 | Satoh et al. | 369/284 X |
| 4,860,273 | 8/1989 | Sawano et al. | 369/100 |
| 4,939,717 | 7/1990 | Ohno et al. | 369/116 |

FOREIGN PATENT DOCUMENTS

| 103892 | 3/1984 | European Pat. Off. . |
|---|---|---|
| 2079031 | 1/1982 | United Kingdom . |

OTHER PUBLICATIONS

Encyclopedia of Chemical Technology, vol. 23, 3rd Edition, 1983, pp. 498.
Bell et al., IEEE Journal of Quantum Electronics, vol. QE-14, No. 7, Jul. 1978, pp. 487–495.
IBM Technical Disclosure Bulletin, vol. 25, No. 11B, Apr. 1983, Armonk USA, pp. 5940–5941; K. Y. Ahn & Al.: "Deformed Mirror Optical Storage Structure".

*Primary Examiner*—William M. Shoop, Jr.
*Assistant Examiner*—David Martin
*Attorney, Agent, or Firm*—Oblon, Spivak, McClelland, Maier & Neustadt

[57] ABSTRACT

An optical information recording medium comprising a light transmitting substrate, a light absorptive layer overlaying the substrate to absorb a laser beam and a light reflective layer overlaying the light absorptive layer, wherein an optical parameter represented by $\rho = n_{abs}d_{abs}/\lambda$ where $n_{abs}$ is the real part of the complex refractive index of the light absorptive layer, $d_{abs}$ is the thickness of the light absorptive layer and $\lambda$ is the wavelength of a reading laser beam, is $0.05 \leq \rho \leq 0.6$, and the imaginary part $k_{abs}$ of the complex refractive index of the light absorptive layer is at most 0.3.

9 Claims, 8 Drawing Sheets

OPTICAL INFORMATION RECORDING MEDIUM

The present invention relates to a writable optical information recording medium having at least a light absorptive layer to absorb a laser beam and a light reflective layer formed on a transparent substrate.

Conventional so-called writable optical information recording media of such type have a recording layer of e.g. a metal such as Te, Bi or Mn or a dye such as cyanine, merocyanine or phthalocyanine, and they are designed to record data in such a manner that when irradiated with a laser beam, such recording layer is deformed, sublimed, evaporated or modified to form pits. With optical information recording media having such recording layer, it is common to form a space behind the recording layer to facilitate the deformation, sublimation, evaporation or modification of the recording layer for the formation of the pits. A typical example is a laminated structure so-called an air sandwich structure wherein a pair of substrates are laminated with a space therebetween.

With the optical information recording media of this type, a writing laser beam is irradiated through a transparent substrate to form optically readable pits in the recording layer. For reproducing the recorded data, a reading laser beam having a less power than the writing laser beam is irradiated through the substrate, and the contrast between the light reflected from the pits and the light reflected from non-pitted portion, is read as an electrical signal.

On the other hand, optical information recording media of so-called ROM (read only memory) type wherein data are already recorded, and no further data are recordable or the recorded data are no longer erasable or rewritable, are widely practically employed in the sound recording and information treating fields. Optical information recording media of this type have no such a recording layer as described above. Prepits or pregrooves corresponding to data to be reproduced are already formed on a substrate of e.g. polycarbonate by e.g. press molding, a reflective layer of a metal such as Au, Ag, Cu or Al is formed thereon, and a protective layer is further provided thereon.

The most typical optical information recording medium of this ROM type is a compact disc so-called CD which is widely used in the sound recording and information treating fields. The specification for recording and read-out signals for this CD is standardized, and the reproducing or play back apparatus for CD in accordance with the standards is widely available as compact disc players (CD players).

The above-mentioned optical information recording media have a disc shape having an opening at the center for engagement with a rotary shaft. Namely, they take a form of optical discs.

Such optical information recording media employ a laser beam in the same manner as CD. Therefore, it is strongly desired for such media to follow the same standards as the widely prevailing standards for CD.

However, conventional writable optical information recording media have a recording layer which is not present in CD, and they are designed to form pits in the recording layer and not in the substrate. Further, in some cases, a space is provided to facilitate the formation of pits in this recording layer, and the reflectance of a laser beam is low as compared with CD. Consequently, the read-out signals are naturally different from those of CD. Therefore, it has been difficult for the conventional optical information recording media to meet the above-mentioned standards for CD. Particularly, the reflectance and the degree of modulation of the read-out signals used to be too low to meet the standards. Therefore, it has been difficult to provide a writable optical information recording medium which satisfies the CD standards.

Therefore, it is an object of the present invention to provide a writable optical information recording medium which has high-reflectance and which is capable of providing read-out signals having a high degree of modulation to meet the CD standards.

The present invention provides an optical information recording medium comprising a light transmitting substrate, a light absorptive layer overlaying the substrate to absorb a laser beam and a light reflective layer overlaying the light absorptive layer, wherein an optical parameter represented by $\rho = n_{abs} d_{abs}/\lambda$ where $n_{abs}$ is the real part of the complex refractive index of the light absorptive layer, $d_{abs}$ is the thickness of the light absorptive layer and $\lambda$ is the wavelength of a reading laser beam, is $0.05 \leq \rho \leq 0.6$, and the imaginary part $k_{abs}$ of the complex refractive index of the light absorptive layer is at most 0.3.

For the purpose of the present invention, the term "optically readable pits" or "pits" generally includes optically readable or detectable marks of all kinds.

With this optical information recording medium, when the light absorptive layer is irradiated with a laser beam, it generates heat upon absorption of the laser beam and at the same time, it undergoes melting, evaporation, sublimation, reaction, decomposition or modification. When the laser beam is applied in a focused state to the light absorptive layer, energy is locally generated. The impact of such energy reaches the surface layer of the substrate adjacent to the light absorptive layer, whereby the surface layer is locally deformed to form optically modified portions (optically readable pits).

Thus, the optically modified portions formed on the surface layer of the substrate are different from those formed in the conventional recording layer, and they rather resemble pits of CD which are preformed on a substrate surface by e.g. press molding. In the optically writable information recording medium of such a structure, a reflective layer can be provided on the light absorptive layer in close contact therewith. Thus, also from the configuration point of view, the optical information recording medium of the present invention is similar to CD. It is particularly significant that it is thereby possible to readily obtain an optically writable information recording medium, particularly a write-once type recordable optical disc, which meets the CD standards with respect to the reflectance of the reading laser beam, the degree of modulation of the read-out signals and the block error rate.

Now, the preferred embodiments of the present invention will be described with reference to the drawings, in which.

Figure 10:
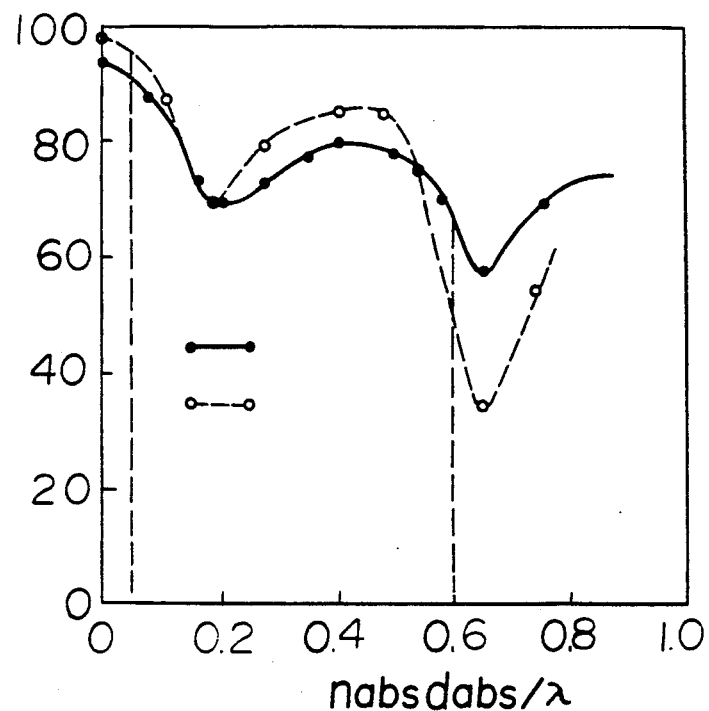

FIG. 10 is a graph showing the relation between an optical parameter represented by the formula $\rho = n_{abs} d_{abs}/\lambda$ where $n_{abs}$ is the real part of the complex refractive index of the light absorptive layer Of the optical disc, $d_{abs}$ is the thickness of the light absorptive layer and $\lambda$ is the wavelength of the reading laser beam and the reflectance of the reading laser beam.

Figure 11:
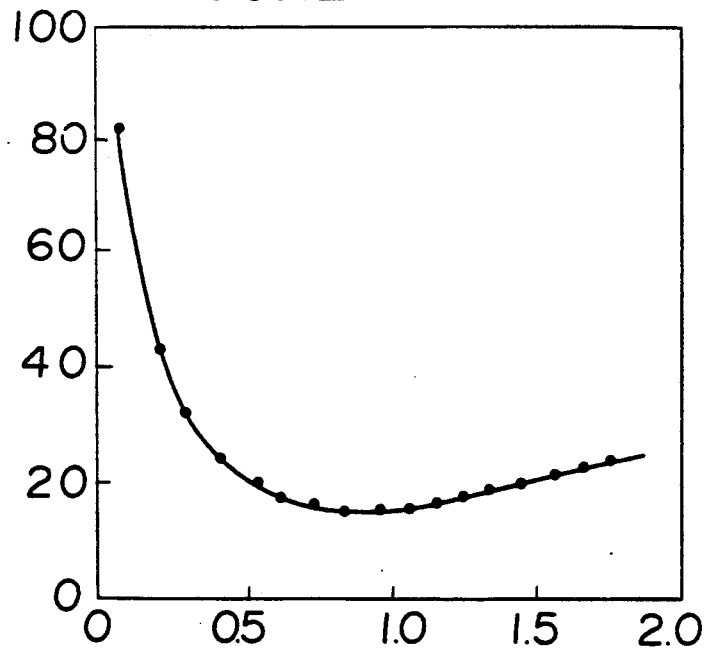

FIG. 11 is a graph showing the relation between the imaginary part $k_{abs}$ of the complex refractive index of the light absorptive layer of the optical disc and the reflectance of the reading laser beam.

Figure 12:
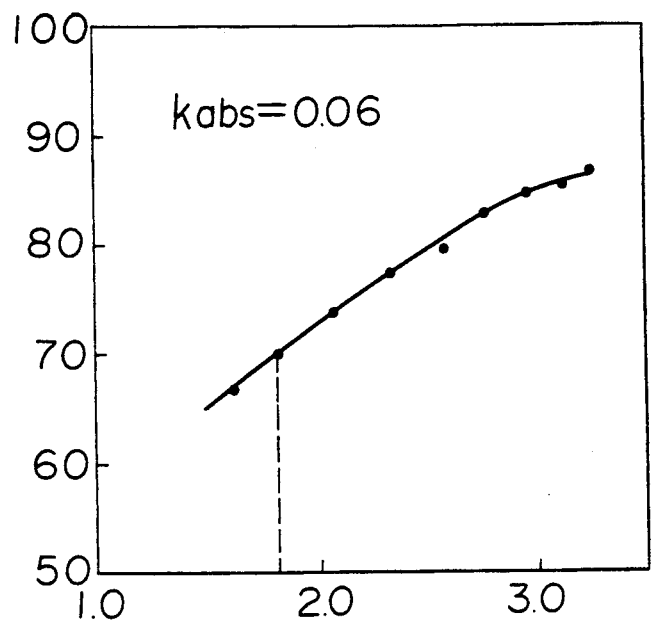

FIG. 12 is a graph showing the relation between the real part $n_{abs}$ of the complex refractive index of the light absorptive layer of the optical disc and the reflectance of the reading laser beam.

Figure 13:
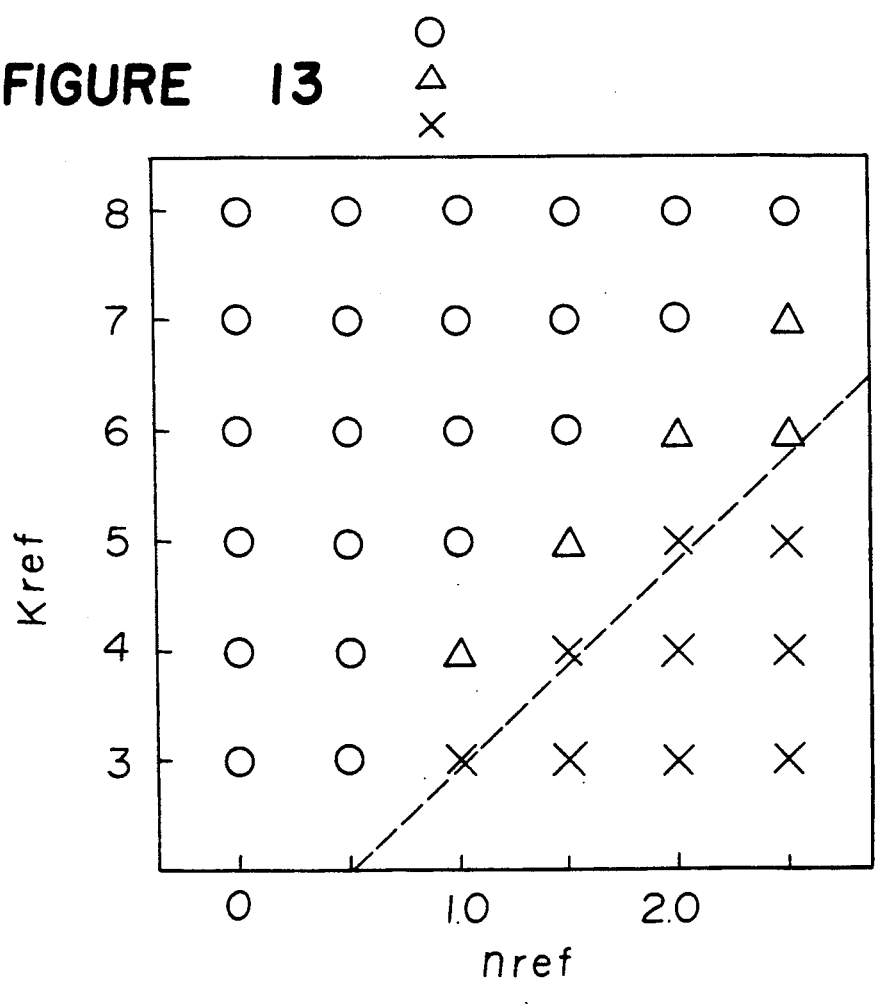

FIG. 13 is a graph showing the relation among the real part $n_{ref}$ of the complex refractive index of the light reflective layer, the imaginary part $k_{ref}$ of the complex refractive index of the light reflective layer and the reflectance of the reading laser beam.

Figure 14:
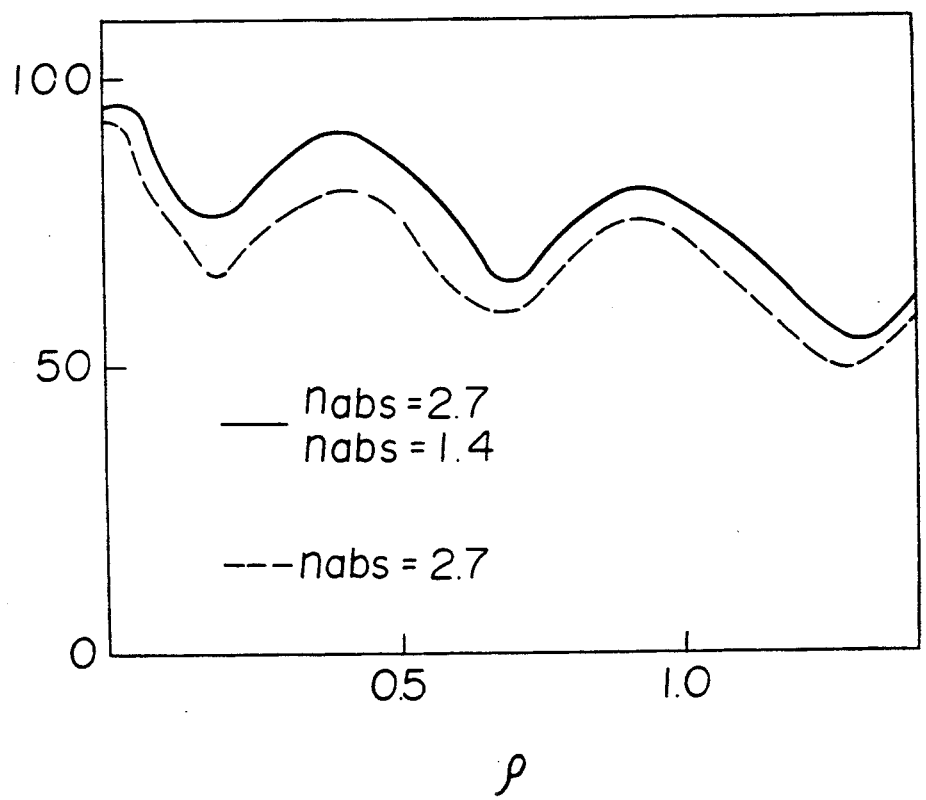

FIG. 14 is a graph showing the relation between $\rho = (n_{abs} d_{abs} + n_{ehs} d_{ehs})/\lambda$ where $n_{abs}$, $d_{abs}$ and $\lambda$ are as defined above, $n_{ehs}$ is the rear part of the complex refractive index of an enhancing layer and $d_{ehs}$ is the thickness of the enhancing layer and the reflectance of the reading laser beam.

FIGS. 15 to 19 illustrate output waveforms obtained by the play back of the optical discs of Examples and Comparative Examples by a commercially available CD player.

FIGS. 1 to 9 diagrammatically illustrate various structures of the optical information recording medium of the present invention. In these Figures, reference numeral 1 indicates a light transmitting substrate, numeral 2 indicates a light absorptive layer overlaying the substrate, and numeral 3 indicates a light reflective layer overlaying the light absorptive layer. Reference numeral 4 indicates a protective layer.

FIG. 10 is a graph showing the relation between the above-mentioned optical parameter $\rho = n_{abs} d_{abs}/\lambda$ and the reflectance of the laser beam irradiated from the substrate side, in a case where a semiconductor laser beam having a wavelength $\lambda$ of 780 nm was used as the reading laser beam, as will be explained hereinafter in Examples 1 and 3. Based on the relation shown in this graph, the present inventors have found that when the optical parameter $\rho$ is adjusted to a level within a range of from 0.05 to 0.6, the reflectance can be made at least 70% as prescribed in the above-mentioned CD standards. Further, when EFM signals are recorded on this optical information recording medium by a conventional recording method e.g. by irradiating it with a semiconductor laser beam having a wavelength of 780 nm at a linear speed of 1.2 m/sec with a recording power of 6.0 mW, and then the recorded signals are reproduced by a commercially available CD player, it is possible to obtain output signals which meet the CD standards with $I_{11}/I_{top}$ being at least 0.6 and $I_3/I_{top}$ being from 0.3 to 0.7.

As shown in the graph of FIG. 10, a reflectance of at least 70% can still be obtained in the region where the optical parameter $\rho$ is less than 0.05 or a region where the parameter $\rho$ exceeds 0.6, for example, in the case of Comparative Example 2 given hereinafter where $\rho \geq 0.8$. However, when the parameter $\rho$ (which represents the optical thickness of the light absorptive layer) is less than 0.05, it will be difficult to form distinct pits for recording data and the desired read-out signals as mentioned above can not be obtained. On the other hand, when the parameter $\rho$ exceeds 0.6, the recording properties tend to be poor, and $I_3/I_{top}$ tends to be less than 0.3 thus leading to an increase of jitter errors. Thus, the recording and the reproduction of the data will likewise be difficult, and the desired read-out signals as mentioned above can hardly be obtained.

Further, a sufficient light transmittance of the light absorptive layer must be secured in order to obtain the above-mentioned reflectance for an optical information recording medium. For example, FIG. 11 illustrates the change in the reflectance when the imaginary part $k_{abs}$ of the complex refractive index of the light absorptive layer is changed from a value close to 0 to 2.0 while maintaining the real part $n_{abs}$ of the complex refractive index at a constant level of 2.4, by changing the light transmittance of the light absorptive layer composed of a cyanine dye in an optical information recording medium wherein a gold film is used as the reflective layer. In order to maintain a high reflectance under the above conditions, the transmittance of the light absorptive layer must be sufficiently high. In this respect, the imaginary part $k_{abs}$ of the complex refractive index of the light absorptive layer must be at most 0.3.

The reflectance of the reading laser beam of the optical information recording medium becomes highest when the optical parameter $\rho = n_{abs} d_{abs}/\lambda$ is within a range of from 0.30 to 0.5. Therefore, the optical parameter $\rho$ within this range is most preferred.

In the present invention, it is preferred that the light absorptive layer comprises a cyanine dye and the light reflective layer is made of a metal film. More preferably, the cyanine dye for the light absorptive layer is indodicarbocyanine.

More specifically, the cyanine dye for the light absorptive layer in the optical information recording medium is preferably a compound represented by the following formula:

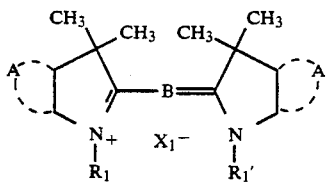

wherein each of A and A' which may be the same or different is a group of atoms forming a benzene ring, a substituted benzene ring, a naphthalene ring or a substituted naphthalene ring, B is pentamethylene (—CH=CH—CH=CH—CH=), of which each hydrogen atom may be substituted by a halogen atom, an alkyl group, an alkoxy group or a diphenylamino group, or which may have a substituted or unsubstituted cyclic side chain bridging a plurality of carbon atoms, each of $R_1$ and $R_1'$ which may be the same or different is a substituted or unsubstituted alkyl, alkoxy, alkylhydroxy, aralkyl, alkenyl, alkylcarboxyl or alkylsulfonyl group, or a substituted or unsubstituted alkylcarboxyl or alkylsulfonyl group bonded to an alkali metal ion or an alkyl group, and $X_1^-$ is an anion such as a halogen atom, perchloric acid, borofluoric acid, benzenesulfonic acid, toluenesulfonic acid, an alkylsulfonic acid, a benzenecarboxylic acid, an alkylcarboxylic acid or a trifluoromethylcarboxylic acid, provided that when $R_1$ and $R_1'$ have a group bonded to an alkali metal ion, $X_1^-$ may be not present.

With the light absorptive layer 2 using the above cyanine dye, it is readily possible by virtue of its specific optical properties, to bring the optical parameter $\rho$ within a range of from $0.05 \leq \rho \leq 0.6$ and the imaginary part $k_{abs}$ of the complex refractive index to a level of at most 0.3. An optical information recording medium having such a light absorptive layer 2 and a light reflective layer 3 made of a metal film behind it, provides a high reflectance, whereby it is readily possible to secure a reflectance of at least 70%, which is prescribed in the CD standards. In a preferred embodiment, the light absorptive layer contains a material which, upon absorption of a laser beam by the light absorptive layer, undergoes a temperature rise and, at the temperature of from 100° to 600° C., undergoes an exothermic reaction with generation of a gas. In this embodiment, since the light absorptive layer contains a material which undergoes a temperature rise upon absorption of the laser beam and undergoes an exothermic reaction with generation of gas, at a temperature of from 100° to 600° C., the energy convertion from the energy of the laser beam takes place at a relatively low temperature, whereby distinct pits will be formed in the adjacent layer.

Thus, the pits formed on the surface of the light transmitting substrate resemble the pits preformed by e.g. press molding in CD. Therefore, it is possible by this embodiment to readily obtain a writable optical information recording medium which meets the CD standards.

Here, the critical temperature for the exothermic reaction of the components of the light absorptive layer has been limited to a range of from 100° to 600° C. for the following reasons. Namely, if the critical temperature is lower than 100° C., it is likely to undergo a change by an environmental condition such as exposure to direct sunlight. On the other hand, if the temperature is higher than 600° C., a large amount of energy is required to reach the temperature level, and the sensitivity tends to be low. For the stability and high sensitivity, a temperature range of from 120° to 350° C., particularly from 150° to 300° C., is preferred.

In the present invention, it is preferred that $n_{abs}$ is $n_{abs} \leq 1.8$ and $k_{abs}$ is $0.001 \leq k_{abs} \leq 0.3$.

As shown in FIG. 10, the relation between the optical parameter $\rho$ and the reflectance is represented by a periodical function. In order to have a high reflectivity, it is advisable to select the optical parameter close to the first peak ($\rho=0$) or to the second or third peak. The reflectance at the third or subsequent peak is lower than that of the first or second peak.

Further, at the first peak, the sensitivity and the heat energy stored in the absorptive layer are less than those in the second or subsequent peak. Therefore, the second peak is practically most suitable. FIG. 12 illustrates one embodiment of the relation between the reflectance of the second peak suitable for practical application and the real part $n_{abs}$ of the complex refractive index of the light absorptive layer. In this embodiment, the light reflective layer 3 was made of gold and formed directly on the light absorptive layer 2, and the relation was obtained by calculation with $k_{abs}=0.06$ and $\lambda=780$ nm.

Based on the relation shown by this graph, the present inventors have found it possible to bring the reflectance to a level of at least 70% to meet the CD standards, by adjusting the real part $n_{abs}$ of the complex refractive index of the light absorptive layer to a level of at least 1.8. Further, when EFM signals are recorded to this optical information recording medium by irradiating e.g. a semiconductor laser beam having a wavelength of 780 nm at a linear speed of 1.2 m/sec with a recording power of 6.0 mW and the recorded signals are reproduced by a commercially available CD player, it is possible to obtain a distinct eye pattern which meets CD standards. It has also been found that $I_{11}/I_{top}$ obtained from this eye pattern is at least 0.6, and $I_3/I_{top}$ is from 0.3 to 0.6.

In another embodiment, the real part $n_{ref}$ of the complex refractive index of the light reflective layer and the imaginary part $k_{ref}$ of the complex refractive index of the light reflective layer satisfy a relation of $k_{ref} \leq 2n_{ref}+0.8$.

FIG. 13 is a graph showing the reflectance of the laser beam irradiated from the substrate side, when the real part $n_{ref}$ and the imaginary part $k_{ref}$ of the complex refractive index of the light reflective layer were varied under the condition such that the real part $n_{abs}$ f the complex refractive index of the light absorptive layer of the optical information recording medium was from 1.5 to 3 and the imaginary part $k_{abs}$ of the composite refractive index of the light absorptive layer was at least 2, and a semiconductor laser having a wavelength $\lambda$ of 780 nm was used as the reading laser beam. Based on the relation shown by this graph, the present inventors have found it possible to bring the reflectance to a level of at least 70% to meet the CD standards, by adjusting the relation of the real part $n_{ref}$ of the complex refractive index of the light reflective layer and the imaginary part $k_{ref}$ of the complex refractive index of the light reflective layer to $k_{ref} \leq 2n_{ref}+0.8$. Further, when EFM signals are recorded on this optical information recording medium by irradiating a semiconductor laser beam having a wavelength of 780 nm at a linear speed of 1.2 m/sec with a recording power of 6.0 mW, and the recorded signals are reproduced by a commercially available CD player, it is possible to obtain a distinct eye pattern which meets the CD standards, and it is possible to obtain output signals with $I_{11}/I_{top}$ obtainable from this eye pattern being at least 0.6 and $I_3/I_{top}$ being from 0.3 to 0.7.

In another preferred embodiment of the present invention, an enhancing layer which is transparent to the wavelength of the reading laser beam is disposed between the light absorptive layer and the light reflective layer. The optical parameter represented by $$\rho = \frac{n_{abs}d_{abs} + n_{ehs}d_{ehs}}{\lambda}$$

where $n_{abs}$, $d_{abs}$ and $\lambda$ are as defined above, $n_{ehs}$ is the real part of the complex refractive index of the enhancing layer and $d_{ehs}$ is the thickness of the enhancing layer, is preferably $0.05 \leq \rho \leq 1.1$.

The product of the real part $n_{abs}$ of the complex refractive index of the light absorptive layer 2 of the optical information recording medium and the thickness $d_{abs}$ of the light absorptive layer 2, is an optical thickness of the light absorptive layer 2. Likewise, the product of the real part $n_{ehs}$ of the complex refractive index of the enhancing layer 16 and the thickness $d_{ehs}$ of the enhancing layer 16, is an optical thickness of the enhancing layer 16. The relation between the optical parameter $\rho$ obtained by dividing the sum of these optical thicknesses by the wavelength $\lambda$, and the reflectance of the laser beam of the optical information recording medium, is represented by a periodical function as shown in FIG. 14. Here, two curbes in the Figure were obtained when the real part $n_{abs}$ of the complex refractive index of the light absorptive layer 2 was 2.7. The solid line curve indicates a case where an enhancing layer 16 is provided, and the real part $n_{ehs}$ of the complex refractive index was adjusted to 1.4. Whereas, the dotted line curve represents a case where no enhancing layer was provided. Each case represents a change in the reflectance of a laser beam having a wavelength $\lambda$ of 780 nm when the value of the optical parameter $\rho$ was change by changing the layer thickness.

As is evident from this graph, the overall reflectance is substantially higher in the case of the solid line representing the optical information recording medium provided with the enhancing layer 16 than the case of the dotted line representing the optical recording medium provided with no enhancing layer.

With the optical information recording medium shown by the dotted line, in order to obtain a high reflectance of the laser beam at a level of at least 70%, it is necessary to adjust the optical parameter $\rho$ in the vicinity of the second peak in FIG. 14 taking into consideration the sensitivity of the light absorptive layer 2 or the heat energy stored in the same layer 2. Whereas, with the optical information recording medium shown by the solid line, by virtue of the function of the enhancing layer 16, the reflectance of the laser beam is higher entirely, and it is possible to select the optical parameter $\rho$ within a wide range. Specifically, the optical parameter $\rho$ may be selected within a range from the first peak except for the range of $\rho \leq 0.05$ where the thickness of the light absorptive layer 2 will have to be very thin, to $\rho \leq 1.1$ i.e. over the third peak.

The optical information recording medium is prepared usually by coating the above-mentioned dye dissolved in an organic solvent, on a light transmitting substrate made of e.g. polycarbonate having prepits or pregrooves formed on its surface, followed by drying. However, when the optical information recording medium is produced by such a method, it is likely that the surface layer of the transparent substrate 1 will be modified by the solvent used for the dye, or the prepits or pregrooves already formed on the surface of the light transmitting substrate are likely to be dissolved or deformed by the solvent, whereby the properties for recording and reproducing the data are likely to be adversely affected. Particularly, the pregrooves or prepits already formed on the surface of the light transmitting substrate are intended for providing a servo information, etc. for the optical pickup for recording or playing back. Therefore, if they are deformed, data can not be accurately recorded, thus leading to recording errors.

In order to overcome such problems, according to a preferred embodiment of the present invention, a solvent resistant layer is provided on the substrate to protect the substrate from a solvent used for a dye in the light absorptive layer.

In this embodiment, a solvent resistant layer 6 having resistance against the solvent used for the dye for the light absorptive layer, is formed on the surface of the light transmitting substrate 1, and then the light absorptive layer 2 is formed thereon, whereby it is possible to prevent the surface of the light transmitting substrate 1 from being modified or dissolved by the solvent or to prevent the pregrooves or prepits from being dissolved or deformed by the solvent. Thus, prerecorded signals can be reproduced accurately from the pregrooves or prepits, whereby it is possible to accurately record the information to the optical information recording medium and to reproduce the data accurately.

The solvent resistant layer 6 is made of a material resistant to the solvent for the organic dye for the light absorptive layer 2. Such material includes, for example, an inorganic dielectric such as $SiO_2$, a polymer such as an epoxy resin, a silane coupling agent, a titanate coupling agent, a polymer obtained by photocuring a monomer or oligomer of an acrylate or methacrylate, and a metal alcoholate.

The light transmitting substrate 1 is made of a material having high transparency to laser beams and is usually made of a resin having excellent impact strength such as a polycarbonate, an acrylate resin or an epoxy resin. However, the substrate may be made of any other material so long as it is transparent to writing and reading laser beams and at least the surface layer adjacent to the light absorptive layer is deformable by energy generated by the light absorptive layer upon absorption of the writing laser beam, to form optically readable pits. In this respect, the substrate or at least the surface layer thereof preferably has a heat distortion temperature within a range of from 85° to 200° C., more preferably from 90° to 150° C., as measured in accordance with ASTM D648 under a load of 4.6 kg/cm$^2$ and/or a Rockwell hardness within a range of from M200 to M75, more preferably from M105 to M80, as measured in accordance with ASTM D785. When the heat distortion temperature or the Rockwell hardness of the substrate is within the above mentioned range, the energy generated by the light absorptive layer 2 upon absorption of the writing laser beam can effectively be absorbed by the local deformation of the surface layer of the substrate 1 so that no substantial strain will remain in the formed pits, whereby the stability of the recorded data will be secured. If the heat deformation temperature or the hardness is too low, the formed pits tend to easily be deformed by heat or external force, whereby the stability will be poor. On the other hand, if the heat distortion temperature or the hardness is too high, the energy generated by the light absorptive layer 2 can hardly be absorbed in the form of deformation of the substrate 1, and it is difficult to form distinct pits 5, whereby it will be difficult to obtain read-out signals having a high degree of modulation.

The thickness of the substrate 1 is not critical, but it is usually within a range of from 1.1 to 1.5 mm.

The light absorptive layer 2 is a layer which absorbs a laser beam entered through the light transmitting substrate 1, whereupon it generates heat and at the same time undergoes ablation, evaporation, sublimation, reaction, decomposition or modification. It is formed usually by spin coating a dye material such as a cyanine dye on the substrate 1 or on an inter-layer 6 formed on the substrate 1.

The thickness of the light absorptive layer 2 is usually within a range of from 20 to 500 nm, preferably from 100 to 300 nm.

The light reflective layer 3 is usually made of a metal such as gold, silver, copper, aluminum or an alloy thereof. The thickness of the light reflective layer 3 is usually within a range of from 30 to 150 nm, preferably from 40 to 130 nm.

The protective layer 4 is made of a resin excellent in the impact resistance like the light transmitting substrate 1 and is most commonly formed by coating a ultraviolet curable resin by spin coating, followed by irradiation with ultraviolet rays for curing. As other materials, an epoxy resin, an acrylate resin and a silicone hard coat resin may usually be used. It is also possible to employ a resilient material such as a urethane resin to obtain a cushion effect.

The thickness of the protective layer 4 is not critical and is usually within a range of from 3 to 30 $\mu$m, preferably from 5 to 15 $\mu$m.

Figure 1:
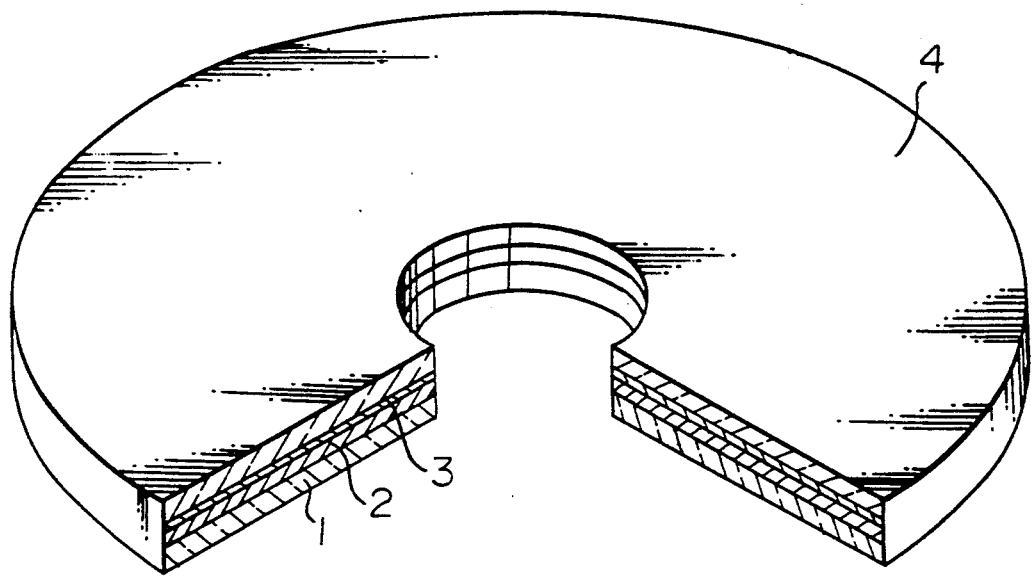
FIG. 1 is a partially cross-sectional diagrammatical perspective view illustrating an embodiment of the structure of the optical information recording medium of the present invention.
Figure 2:
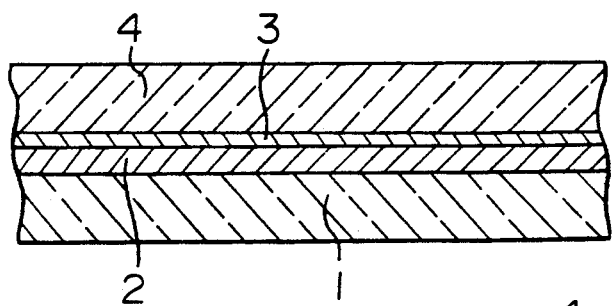
FIG. 2 is a partially enlarged cross-sectional view taken along the track of the information recording medium of FIG. 1 prior to optical recording.
Figure 3:
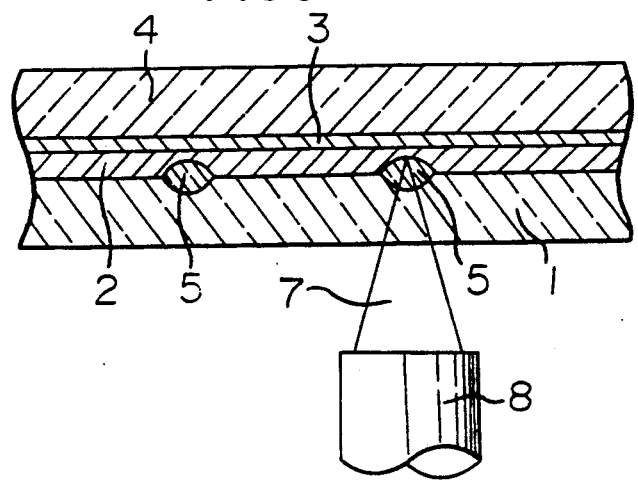
FIG. 3 is a partially enlarged cross-sectional view taken along the track of the optical information recording medium of FIG. 1 after the optical recording.
Figure 4:
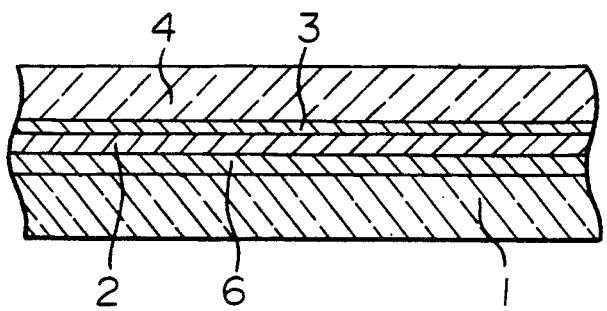
FIG. 4 is a partially enlarged cross-sectional view taken along the track of another embodiment of the optical information recording medium of the present invention prior to optical recording.
Figure 5:
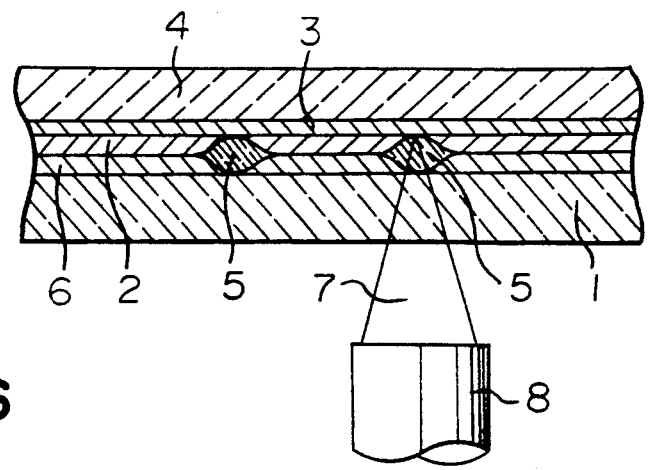
FIG. 5 is a partially enlarged cross-sectional view taken along the track of the same embodiment after the optical recording.
Figure 6:
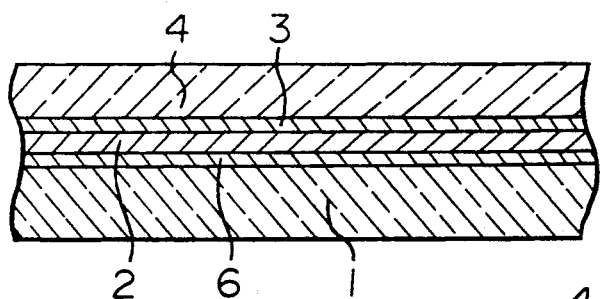
FIG. 6 is a partially enlarged cross-sectional view taken along the track of a still another embodiment of the optical information recording medium of the present invention prior to optical recording.
Figure 7:
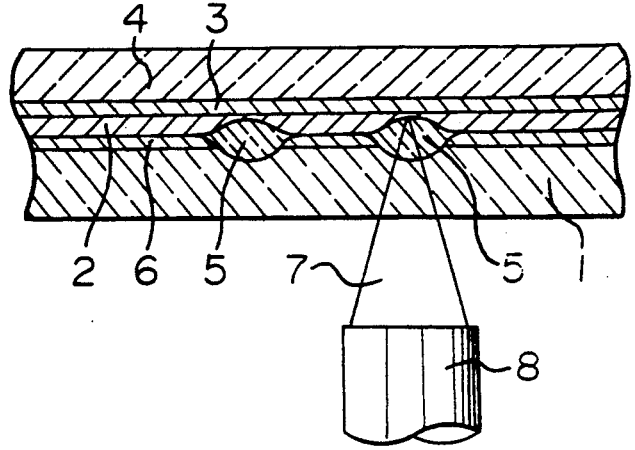
FIG. 7 is a partially enlarged cross-sectional view taken along the track of the embodiment of FIG. 6 after the optical recording.

As shown in FIGS. 4 to 7, an inter-layer 6 such as a resin layer or a solvent resistant layer may be disposed between the substrate 1 and the light absorptive layer 2. As shown in FIGS. 5 and 7, such an inter-layer 6 deforms by the energy generated by the light absorptive layer 2 upon absorption of the writing laser beam to form optically modified pits 5. If such an inter-layer 6 is sufficiently thick, pits 5 will be formed therein as shown in FIG. 5, whereby the inter-layer serves as the surface layer of the substrate 1. If the inter-layer 6 is relatively thin, i.e. has a thickness of at most 30 nm, not only the inter-layer 6 but also the substrate 1 will be deformed as shown in FIG. 7. When such an inter-layer 6 is not present, the surface layer of the substrate 1 will be deformed as shown in FIG. 3 to form optically modified pits 5.

The inter layer 6 preferably has a heat distortion temperature within a range of from 50° to 150° C., more preferably from 85° to 140° C., as measured in accordance with ASTM D648 under a load of 4.6 kg/cm² and/or a Rockwell hardness within a range of from M100 to M50, more preferably from M95 to M75, as measured in accordance with ASTM D785. The heat distortion temperature and the Rockwell hardness of the inter-layer 6 within the above ranges are preferred for the same reasons as mentioned with respect to the heat distortion temperature and the Rockwell hardness of the substrate 1. The inter-layer 6 may be made of a resin such as an acrylate resin, a vinyl chloride resin, a vinylidene chloride resin, a polystyrene resin, a polyester resin, a polyurethane resin, a cellulose resin or a silicone resin. However, any other resin may be employed so long as it satisfies the above-mentioned properties for the inter-layer 6.

The thickness of the inter-layer is usually within a range of from 2 nm to 500 $\mu$m, preferably from 10 to 200 nm.

Figure 8:
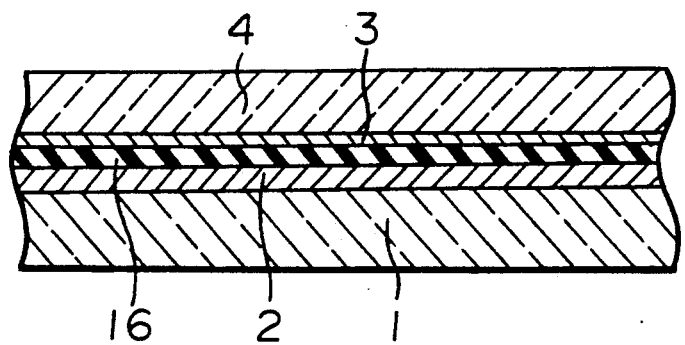
FIG. 8 is a partially enlarged cross-sectional view taken along the track of a further embodiment of the present invention prior to optical recording.
Figure 9:
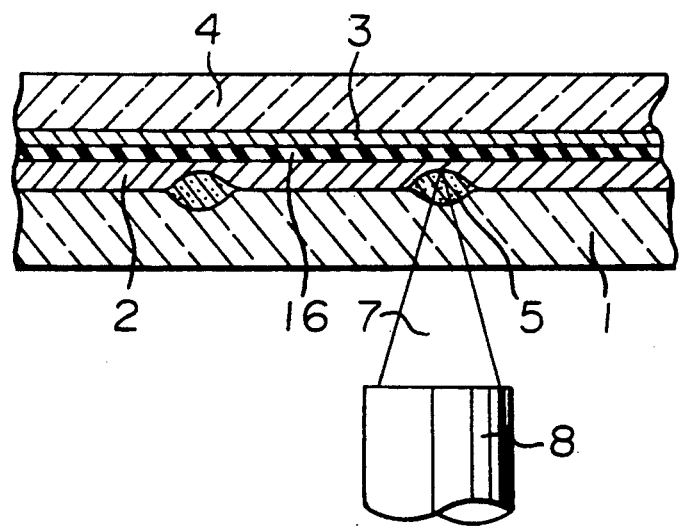
FIG. 9 is a partially enlarged cross-sectional view of the embodiment of FIG. 8 after the optical recording.

As mentioned above, in the present invention, a dielectric layer i.e. enhancing layer 16 transparent (imaginary part $k_{ehs}$ of the complex refractive index=0) to the reading laser beam, may be provided on the light absorptive layer 2, as shown in FIGS. 8 and 9. This enhancing layer 16 may be made of an inorganic dielectric layer of e.g. SiO$_2$, amorphous SiO, Si$_3$N$_4$, SiN, AlN or ZnS, or of an organic dielectric layer of e.g. a silicone resin. As mentioned above, a high reflectance at a level of at least 70% can be obtained by adjusting the optical thickness of the enhancing layer 16 in relation with the light absorptive layer 2 so that the optical parameter $p$ represented by the formula:

$$p = \frac{n_{abs}d_{abs} + n_{ehs}d_{ehs}}{\lambda}$$

wherein $n_{abs}$, $d_{abs}$, $n_{ehs}$, $d_{ehs}$ and $\lambda$ are as defined above, will be $0.05 \leq p \leq 1.1$.

As the substituents A and A' of the cyanine dye represented by the foregoing formula, a substituted or unsubstituted benzene ring and a substituted or unsubstituted naphthalene ring may be mentioned. The substituents thereof include, for example, an alkyl group, an alkoxy group, a hydroxy group, a carboxyl group, a halogen atom, an allyl group, an alkylcarboxyl group, an alkylalkoxy group, an aralkyl group, an alkylcarbonyl group, a sulfonate alkyl group bonded with a metal ion, a nitro group, an amino group, an alkylamino group, an aryl group, a phenylethylene group and the following:

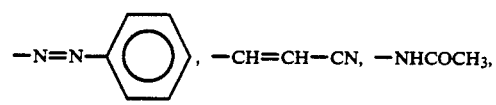

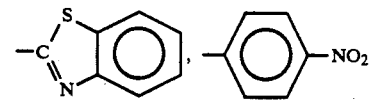

Further, a combination of a plurality of cyanines having such substituents may be employed. For example, substituents for the substituents A and A' of such compounds may be, for example, as shown in Table 1.

TABLE 1

| First cyanine | Second cyanine |
|---|---|
| —C$_n$H$_{2n+1}$ (n = 1, 2, 3, 4) | —NO$_2$ |
| —NO$_2$ | —OC$_n$H$_{2n+1}$ (n = 1, 2, 3, 4) |
| —C$_n$H$_{2n+1}$ (n = 1, 2, 3, 4) | —OC$_n$H$_{2n+1}$ (n = 1, 2, 3, 4) |
| 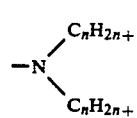 (n = 1, 2, 3, 4) | —C$_n$H$_{2n+1}$ (n = 1, 2, 3, 4) |

TABLE 1-continued

| First cyanine | Second cyanine |
|---|---|
| $-N\begin{matrix}C_nH_{2n+1}\\C_nH_{2n+1}\end{matrix}$ (n = 1, 2, 3, 4) | $-C_nH_{2n+1}$ (n = 1, 2, 3, 4) |
| $-N\begin{matrix}C_nH_{2n+1}\\C_nH_{2n+1}\end{matrix}$ (n = 1, 2, 3, 4) | $-OC_nH_{2n+1}$ (n = 1, 2, 3, 4) |

* One of the two cyanines may be a cyanine other than indodicarbocyanine.

As the cyclic side chain bonding to B of the foregoing formula, a linking chain may be mentioned which is composed of carbon or other atoms forming e.g. a 4-membered, 5-membered or 6-membered ring together with a plurality of carbon atoms of the pentamethine chain by bridging e.g. the second and fourth carbon atoms, and it may have a substituent. The substituents directly attached to B or located on the above cyclic side chain, include a halogen atom, a diphenylamino group, an alkoxy group (e.g. a lower alkoxy group such as methoxy or ethoxy), and an alkyl group (e.g. a lower alkyl group such as methyl or ethyl).

The light absorptive layer may contain in addition to the above cyanine dye, other dyes, resins (e.g. a thermoplastic resin such as nitrocellulose, a thermoplastic elastomer, and liquid rubber), etc.

Specifically, the following examples may be mentioned in addition to those used in the Examples given hereinafter:

1-1
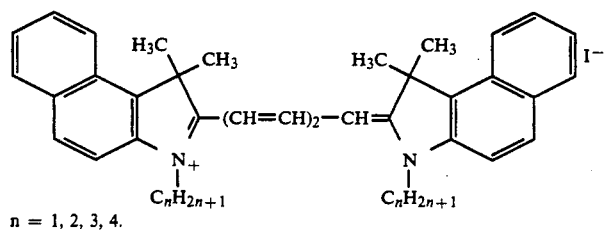
n = 1, 2, 3, 4.

1-2
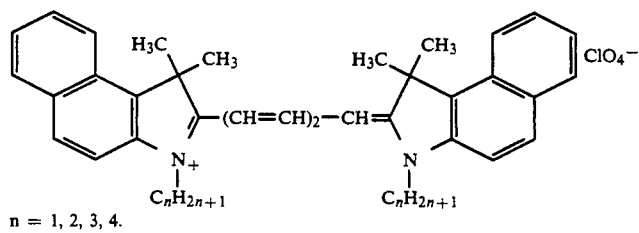
n = 1, 2, 3, 4.

1-3
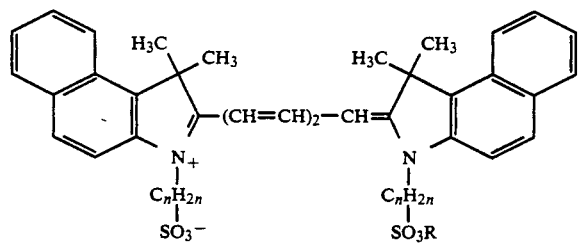
n = 1, 2, 3, 4.
R is alkyl, Na or K.

1-4
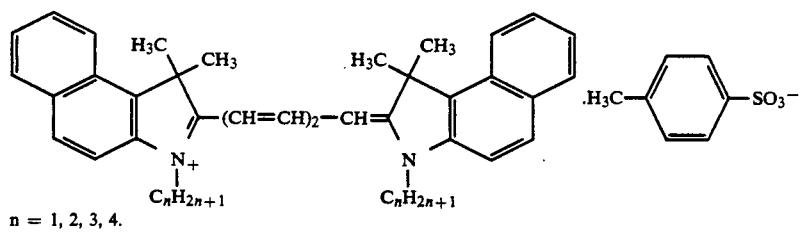
n = 1, 2, 3, 4.

1-5
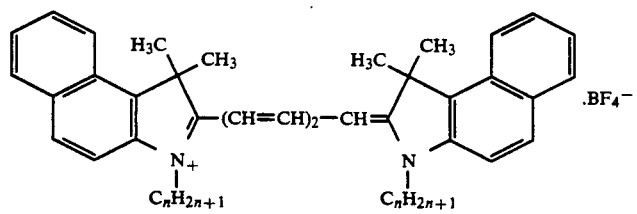

n = 1, 2, 3, 4.
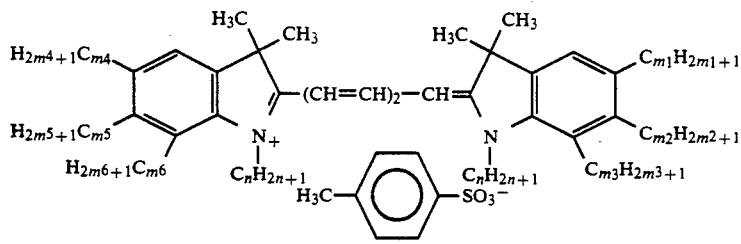
2-1
n = 1, 2, 3, 4 ... 8.
$m_1-m_6$ = 0, 1, 2, 3, 4 (Not all are 0.)
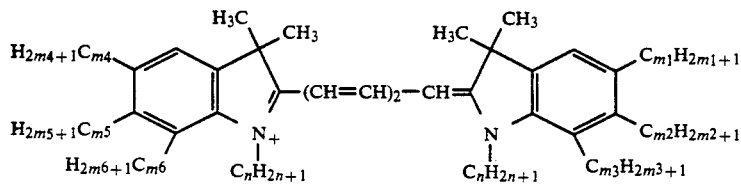
2-2
n = 1, 2, 3, 4 ... 8.
$m_1-m_6$ = 0, 1, 2, 3, 4 (Not all are 0.)
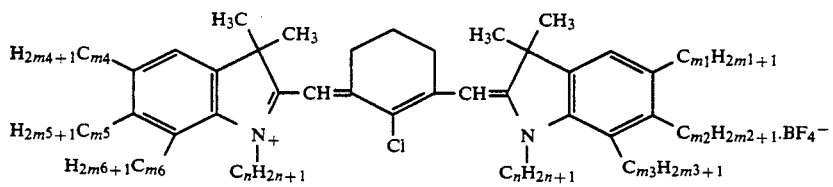
2-3
n = 1, 2, 3, 4 ... 8.
$m_1-m_6$ = 0, 1, 2, 3, 4 (Not all are 0.)
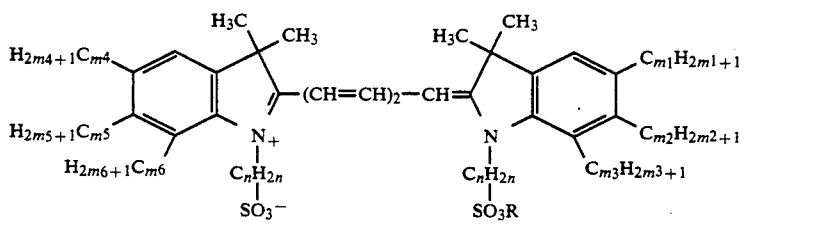
2-4
n = 1, 2, 3, 4 ... 8
$m_1-m_6$ = 0, 1, 2, 3, 4 (Not all are 0.)
R is alkyl, Na or K.
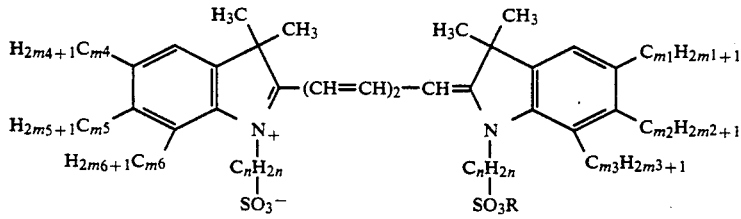
3-1
n = 1, 2, 3, 4 ... 8.
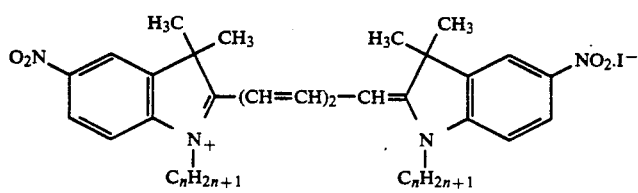
3-2
n = 1, 2, 3, 4 ... 8.

-continued
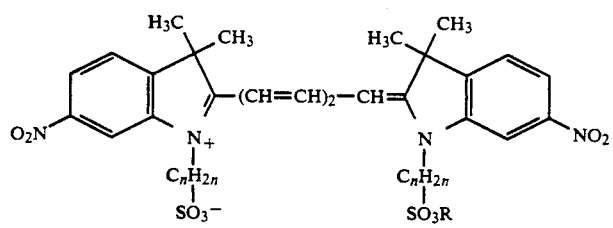
3-3
n = 1, 2, 3, 4 ... 8.
R is alkyl, Na or K.
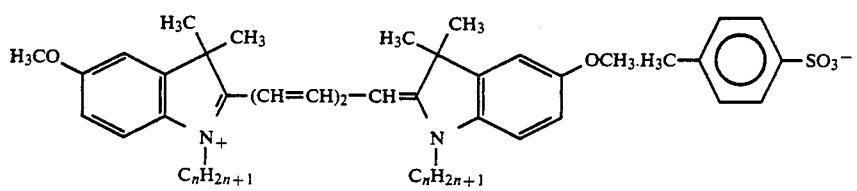
4-1
n = 1, 2, 3, 4 ... 8.
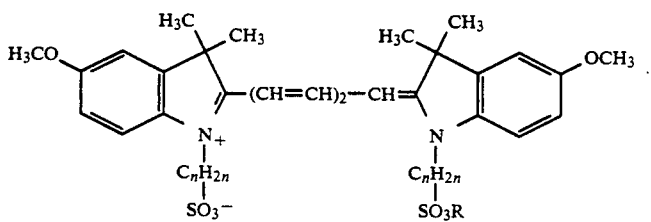
4-2
n = 1, 2, 3, 4 ... 8.
R is alkyl, Na or K.
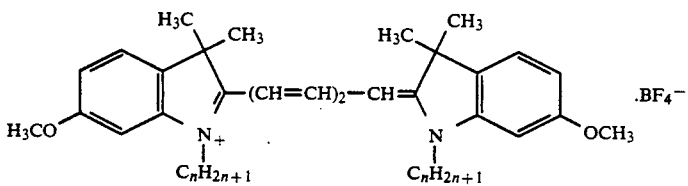
4-3
n = 1, 2, 3, 4 ... 8.
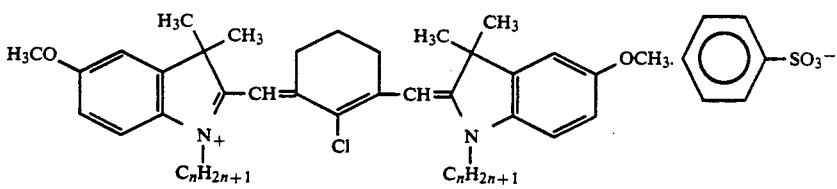
4-4
n = 1, 2, 3, 4 ... 8.
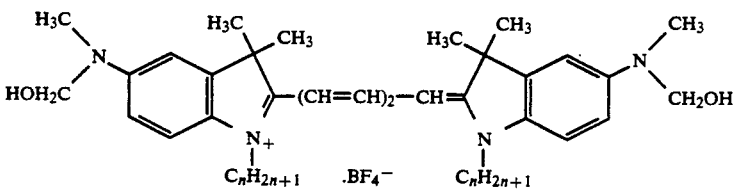
5-1
n = 1, 2, 3, 4 ... 8.

-continued

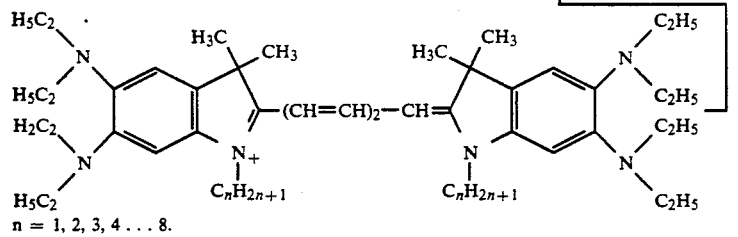

5-2 n = 1, 2, 3, 4 ... 8.

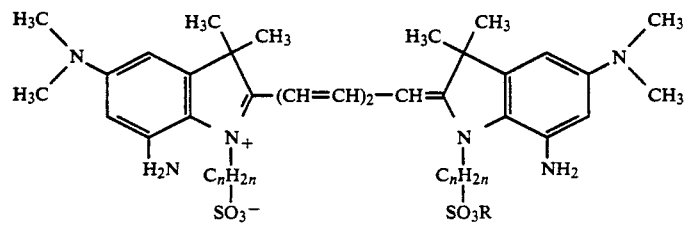

5-3 n = 1, 2, 3, 4 ... 8.
R is alkyl, Na or K.

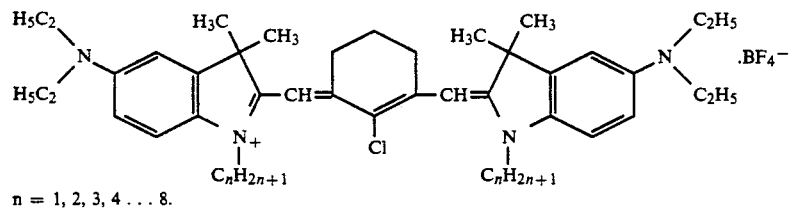

5-4 n = 1, 2, 3, 4 ... 8.

For the preparation of the optical information recording medium of the present invention, firstly a solution of the above cyanine dye dissolved in an organic solvent such as acetyl acetone, methylcellusolve or toluene, is spin-coated on the surface of the substrate 1.

The organic solvent may be an alcohol such as methanol, ethanol, propanol, isopropyl alcohol, butanol, amyl alcohol, isoamyl alcohol, hexyl alcohol, heptanol, benzyl alcohol, cyclohexanol or furfuryl alcohol; an ether such as cellosolve, diethyl cellosolve, butyl cellosolve, methyl carbitol, carbitol, acetal, dioxane or tetrahydrofuran; a ketone such as acetone, methyl ethyl ketone, methyl isobutyl ketone, diacetone alcohol, cyclohexanone or acetophenone; an ester such as ethyl formate, butyl formate, amyl formate, methyl acetate, ethyl acetate, propyl acetate, butyl acetate, amyl acetate, phenyl acetate, methyl cellosolve acetate or cellosolve acetate; a nitrohydrocarbon such as nitromethane, nitroethane, nitropropane, nitrobutanol or nitrobenzene; a halogenated solvent such as methyl chloride, methylene chloride, chloroform, methyl bromide, bromoform, methylene iodide, ethyl chloride, ethylene chloride, ethylidene chloride, trichloroethane, trichloroethylene, propylene chloride, butyl chloride, dichlorobutane, hexachloropropylene, dichloropentane, amyl chloride, chlorobenzene, o-dichlorobenzene, trichlorobenzene, trichlorotoluene or dichlorotoluene; or other solvents such as paraldehyde, crotonaldehyde, furfural, aldol, acetonitrile, formamide, dimethylformamide, acetol, γ-valerolactone, amylphenol, sulfolane, 2-mercaptoethyl alcohol, dimethylsulfoxide, N-methylpyrrolidone or methyl carbamate.

A metal layer is formed thereon by e.g. vacuum vapor deposition or sputtering, and further a protective layer 4 is formed thereon. In such a case, a solvent resistant layer such as $SiO_2$ is preliminarily formed on the light transmitting substrate 1, and then the above-mentioned cyanine dye solution may be spin-coated. Further, an oxidation resistant layer to prevent oxidation of the reflective layer 3 may be interposed between the reflective layer 3 and the protective layer 4.

Each of FIGS. 2, 4, 6 and 8 illustrates a state prior to optical recording by a laser beam. Each of FIGS. 3, 5, 7 and 9 illustrates a state after the optical recording. Namely, when a laser beam 7 from an optical pickup 8 is irradiated in a focused state to the light absorptive layer 2, the surface layer of the substrate 1 is locally deformed by the energy generated at the light absorptive layer 2, to form optically modified pits 5, as diagrammatically illustrated in these Figures.

In the optical information recording medium of the present invention, a layer behind the light absorptive layer 2 relative to the light transmitting substrate 1, such as the light reflective layer 3 or the protective layer 4, is preferably made of a material having a heat distortion temperature and a hardness higher than the layer on which pits 5 are formed. By forming the layer behind the absorptive layer 2 with a hard material, the block error rate of recorded signals can effectively be reduced, whereby it is readily possible to meet the standard requirement of BLER (block error rate) being not higher than $3 \times 10^{-2}$ as prescribed in the CD standards.

Now, the present invention will be described in further detail with reference to Examples. However, it should be understood that the present invention is by no means restricted to such specific Examples.

EXAMPLE 1

A polycarbonate substrate 1 of a disc shape having a thickness of 1.2 mm, an outer diameter of 120 mm and an inner diameter of 15 mm and having a spiral pregroove formed on its surface with a width of 0.8 μm, a depth of 0.08 μm and a pitch of 1.6 μm, was formed by injection molding.

As an organic dye to form the light absorptive layer 2, 0.65 g of 1,1'-dibutyl-3,3,3',3'-tetramethyl-4,5,4',5'-dibenzoindodicarbocyanine perchlorate (product number NK3219, manufactured by Nippon Kanko Shikiso Kenkyusho) was dissolved in 10 ml of a diacetone alcohol solvent, and the solution was coated on the surface of the substrate 1 by spin coating to form a light absorptive layer 2 of a light sensitive dye film having a thickness of 130 nm. The complex refractive index of this light absorptive layer 2 was $n_{abs}=2.7$ and $k_{abs}=0.05$. As mentioned below, the wavelength of λ of the reading semiconductor laser beam was 780 nm, whereby $\rho = n_{abs}d_{abs}/\lambda = 0.45$.

Then, a gold film having a thickness of 400 Å was formed by sputtering on the entire surface of this disc, to form a light reflective layer 3. The complex refractive index of this light reflective layer 3 was $n_{ref}=0.16$, and $k_{ref}=4.67$. Further, On this light reflective layer 3, an ultraviolet curable resin was spin-coated and then cured by irradiation with ultraviolet rays, to form a protective layer 4 having a thickness of 10 μm.

Figure 15:
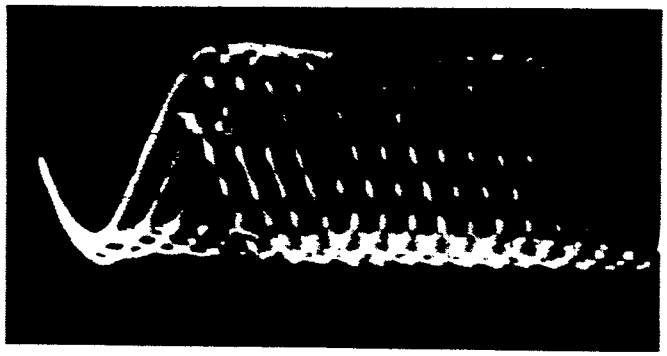

To the optical disc thus obtained, a semiconductor laser having a wavelength of 780 nm was irradiated at a linear speed of 1.2 m/sec with a recording power of 6.0 mW, to record EFM signals. Then, this optical disc was played back by a commercially available CD player (Aurex XR-V73, wavelength of the reading laser beam λ=780 nm), whereby the reproduced waveform was as shown in FIG. 15. The reflectance of this disc was 72%, $I_{11}/I_{top}$ was 0.65, and $I_3/I_{top}$ was 0.35.

The CD standards prescribe that the reflectance is at least 70%, $I_{11}/I_{top}$ is at least 0.6, and $I_3/I_{top}$ is from 0.3 to 0.7. The optical disc of this example meets the standards.

Further, with respect to the same optical disc as in Example 1, the optical parameter $\rho = n_{abs}d_{abs}/\lambda$ was changed within a range of from 0 to 0.8 by changing the thickness $d_{abs}$ of the light absorptive layer 2, whereby the relation between the optical parameter ρ and the reflectance of the optical disc was as shown by the solid line in FIG. 10.

EXAMPLE 2

On a polycarbonate substrate 1 molded in the same manner as in Example 1, 0.5 g of 1,1'-diethyl-3,3,3',3'-tetramethyl-5,5'-diethoxyindodicarbocyanine iodide as an organic dye dissolved in 10 ml of an isopropyl alcohol solvent, was coated by spin coating to form a light of 0.10 μm. The complex refractive index of this light absorptive layer 2 was $n_{abs}=2.65$ and $k_{abs}=0.05$, and $\rho = n_{abs}d_{abs}/\lambda = 0.34$.

A copper film having a thickness of 500 Å was formed by sputtering on the entire surface of this disc to form a light reflective layer 3. The complex refractive index of this light reflective layer 3 was $n_{ref}=0.12$ and $k_{ref}=4.89$. Further, on this light reflective layer 3, an ultraviolet curable resin was spin-coated and cured by irradiation with ultraviolet rays to form a protective layer having a thickness of 10 μm.

Figure 16:
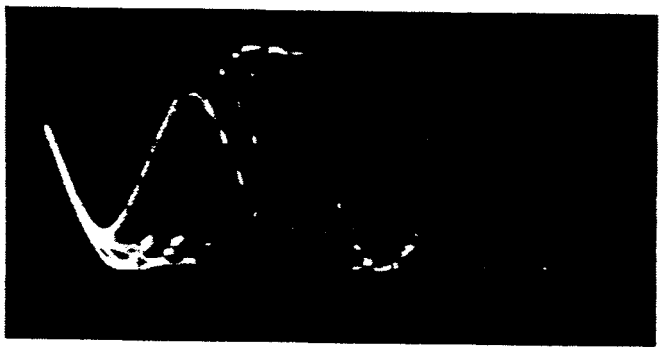

To the optical disc thus obtained, a semiconductor laser beam having a wavelength of 780 nm was irradiated at a linear speed of 1.2 m/sec with a recording power of L 6.0 mW to record EFM signals. Then, this optical disc was played back by the same CD player as used in Example 1, whereby the reproduced waveform as shown in FIG. 16 was obtained. The reflectance of the optical disc was 71%, $I_{11}/I_{top}$ was 0.63, and $I_3/I_{top}$ was 0.33. Thus, the Optical disc of this Example meets the CD standards like the preceding Example.

EXAMPLE 3

On a polycarbonate substrate 1 molded in the same manner as in Example 1, a GaAs film having a thickness of 900 Å was formed by sputtering to form a light absorptive layer 2. The complex refractive index of this light absorptive layer 2 was $n_{abs}=3.6$ and $k_{abs}=0.07$, and $\rho = n_{abs}d_{abs}/\lambda = 0.42$.

A silver film having a thickness of 450 Å was formed by sputtering on the entire surface of this disc to form a light reflective layer 3. The complex refractive index of this light reflective layer 3 was $n_{ref}=0.086$ and $k_{ref}=5.29$. Further, on this light reflective layer 3, an ultraviolet curable resin was spin-coated and cured by irradiation with ultraviolet rays to form a protective layer having a thickness of 10 μm.

Figure 17:

To the optical disc thus obtained, a semiconductor laser beam having a wavelength of 780 nm was irradiated at a linear speed of 1.2 m/sec with a recording power of 6.0 mW to record EFM signals. Then, this optical disc was played back by the same CD player as used in Example 1, whereby the reproduced waveform as shown in FIG. 17 was obtained. The reflectance of the optical disc was 73%, $I_{11}/I_{top}$ was 0.63, and $I_3/I_{top}$ was 0.35. Thus, the optical disc of this Example meets the CD standards like the preceding Examples.

Further, with respect to the same optical disc as in Example 3, the optical parameter $\rho = n_{abs}d_{abs}/\lambda$ was changed within a range of from 0 to 0.8 by changing the thickness $d_{abs}$ of the light absorptive layer 2, whereby the relation of the optical parameter ρ and the reflectance of the optical disc was as shown by the dotted line in FIG. 10.

COMPARATIVE EXAMPLE 1

On a polycarbonate substrate 1 molded in the same manner as in Example 1, 0.065 g of the same organic dye as in Example 1 dissolved in 10 ml of an isopropyl alcohol solvent, was coated by spin coating to form a light absorptive layer 2 made of a dye film having a thickness of 0.01 μm. The optical parameter of this optical disc was $n_{abs}d_{abs}/\lambda = 0.035$.

An aluminum film having a thickness of 450 Å was formed by sputtering on the entire surface of this disc to form a light reflective layer 3. The complex refractive index of this light reflective layer 3 was $n_{ref}=1.87$ and $k_{ref}=7.0$. Further, on this light reflective layer 3, an ultraviolet curable resin was spin-coated and cured by irradiation with ultraviolet rays to form a protective layer having a thickness of 10 μm.

Figure 18:
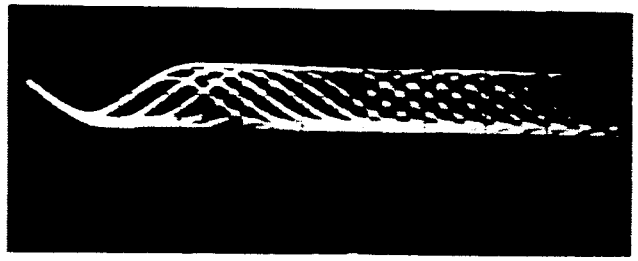

To the optical disc thus obtained, a semiconductor laser beam having a wavelength of 780 nm was irradiated at a linear speed of 1.2 m/sec to record EFM signals, but no adequate recording was possible even with a recording power of 10 mW. Then, this optical disc was played back by the same CD player as in Example 1, whereby the reproduced waveform was as shown in FIG. 18. The 0.20 and $I_3/I_{top}$ was 0.08. Thus the optical disc of this Example does not meet the CD standards.

COMPARATIVE EXAMPLE 2

On a polycarbonate substrate 1 molded in the same manner as in Example 1, 1.3 g of the same organic dye as used in Example 1, dissolved in 10 ml of an isopropyl alcohol solvent, was coated by spin coating to form a light absorptive layer 2 made of a dye film having a thickness of 0.26 μm. With this optical disc, $\rho = n_{abs}d_{abs}/\lambda = 0.90$.

A gold film having a thickness of 400 Å was formed by sputtering on the entire surface of this disc to form a light reflective layer 3. Further, on this light reflective layer 3, an ultraviolet curable resin was spin-coated and cured by irradiation with ultraviolet rays to form a protective layer having a thickness of 10 μm.

Figure 19:
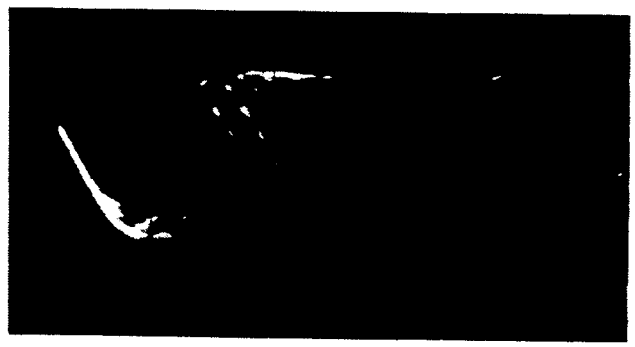

To an optical disc thus obtained, a semiconductor laser beam having a wavelength of 780 nm was irradiated at of 1.2 m/sec with a recording power of 6.0 mW to record EFM signals. Then, this optical disc was played back by the same CD player as in Example 1, whereby the reproduced waveform was as shown in FIG. 19. The reflectance of this optical disc was 62%, $I_{11}/I_{top}$ was 0.60, and $I_3/I_{top}$ was 0.3. As FIG. 19, the eye pattern of the read-out signals was not distinct, and many errors were observed. From these results, this optical disc does not meet the CD standards.

COMPARATIVE EXAMPLE 3

On a polycarbonate substrate 1 molded in the same manner as in Example 1, 0.58 g of 1,1'-diethyl-3,3,3',3'-tetramethylindotricarbocyanine perchlorate (product number NK2885, manufactured by Nippon Kanko Shikiso as an organic dye dissolved in 10 ml of an isopropyl alcohol solvent, was coated by spin coating to form a light absorptive layer 2 made of a dye film having a thickness of 0.12 μm. The complex refractive index of this light absorptive layer 2 was $n_{abs} = 2.7$ and $k_{abs} = 1.6$, and $\rho = n_{abs}d_{abs}/\lambda = 0.42$.

A silver film having a thickness of 600 Å was formed by sputtering on the entire surface of this disc to form a light reflective layer 3. Further, on this light reflective layer 3, ah ultraviolet curable resin was spin-coated and cured by irradiation with ultraviolet rays to form a protective layer having a thickness of 10 μm.

To the optical disc thus obtained, a semiconductor laser beam having a wavelength of 780 nm was irradiated at a linear speed of 1.2 m/sec with a recording power of 6.0 mW to record EFM signals. Then, this optical disk was played back by the same CD player as used in Example 1, whereby the reflectance was as low as 10%, and no reproduction was possible. Thus, this optical disc does not meet the CD standards.

In conventional optical information recording media, a shock absorbing portion such as a space is formed behind the light absorptive layer so that when the light absorptive layer 2 absorbs the laser beam and generates heat and is thereby melted, evaporated, sublimed, deformed or modified, such thermal change may be absorbed by the above shock absorbing portion, and pits will be formed in the light absorptive layer 2 itself. Whereas, in the optical information recording medium of the present invention, a light reflective layer 3 is provided behind the light absorptive layer 2, and a protective layer 4 is formed behind the light reflective layer 3, whereby it is possible to employ a recording system in which such layers behind the light absorptive layer 2 are made of a material more hardly heat-deformable than the substrate 1 to let the substrate 1 absorb the heat change of the light absorptive layer 2 so that pits in the form of protuberances, waves or dents will be formed in the substrate.

For example, in the case of Example 1, the polycarbonate substrate 1 used had a Rockwell hardness (ASTM D785) of M75 and a heat distortion temperature (ASTM D648) of 132° C. under a load of 4.6 kg/cm². Whereas, the protective layer 4 had, after curing, a distortion temperature (ASTM D648) of 150° C. under a load of 4.6 kg/cm². Namely, with the optical information recording medium of this Example, the protective layer 4 behind the light absorptive layer 2 is made of a material hardly heat-deformable as compared with the substrate, whereby the heat change in the light absorptive layer 2 is absorbed by the substrate 1 and optically modified pits in the form of protuberances, waves or dents are formed in the substrate. Thus, as shown diagrammatically in FIG. 3, pits 5 protruded to the light absorptive layer are observed on the surface of the substrate 1 adjacent to the light absorptive layer 2 of the optical disc after recording.

EXAMPLE 4

To a polymethyl methacrylate substrate 1 having the same size as the substrate in Example 1, 0.65 g of 1,1'-dibutyl-3,3,5,3',3',5'-hexamethylindodicarbocyanine fluoroborate as a cyanine dye dissolved in 10 ml of an isopropyl alcohol solvent, was coated by spin coating to form a light absorptive layer 2 having a thickness of absorptive layer 2 was $n_{abs} = 2.7$ and $k_{abs} = 0.05$, and $\rho = n_{abs}d_{abs}/\lambda = 0.38$.

A copper film having a thickness of 500 Å was formed by sputtering on the entire surface of this disc to form a light reflective layer 3. The complex refractive index of this light reflective layer 3 was $n_{ref} = 0.12$ and $k_{ref} = 4.89$. Further, on this light reflective layer 3, an ultraviolet curable resin was spin-coated and cured by layer 4 having a thickness of 10 μm.

To the optical disc thus obtained, FEM signals were recorded in the same manner as in Example 1. Then, this optical disc was played back by the same CD player as used in Example 1, whereby the reflectance of the optical disc was 75%, $I_{11}/I_{top}$ was 0.65, and $I_3/I_{top}$ was 0.35. Thus, the optical disc of this Example meets the CD standards like the preceding Examples.

EXAMPLE 5

On the same light transmitting substrate 1 as used in Example 1, 0.60 g of 1,1'-diethyl-3,3,3',3'-tetramethyl-5,5'-di-t-butylindodicarbocyanine perchlorate as a cyanine dye dissolved in 10 ml of a methyl isobutyl ketone solvent, was coated by spin coating to form a light absorptive layer 2 having a thickness of 0.12 μm. The complex refractive index of this light absorptive layer 2 was $n_{abs} = 2.65$ and $k_{abs} = 0.06$, and $\rho = n_{abs}d_{abs}/\lambda = 0.41$.

A silver film having a thickness of 450 Å was formed by sputtering on the entire surface of this disc to form a light reflective layer 3. The complex refractive index of this light reflective layer 3 was $n_{ref} = 0.086$ and $k_{ref} = 5.29$. Further, on this light reflective layer 3, an ultraviolet curable resin was spin-coated and cured by irradiation with ultraviolet rays to form a protective layer 4 having a thickness of 10 μm.

To the optical disc thus obtained, FEM signals were recorded in the same manner as in Example 1. Then, this optical disc was played back by the same CD player as used in Example 1, whereby the reflectance of the optical disc was 73%, $I_{11}/I_{top}$ was 0.64, and $I_3/I_{top}$ was 0.33. Thus, the Optical disc of this Example meets the CD standards like the preceding Examples.

EXAMPLE 6

On the same light transmitting substrate 1 as used in Example 1, 0.65 g of 1,1'-diethyl-3,3,3',3'-tetramethyl-5,5'-bis(methanolamino)indodicarbocyanine perchlorate as a cyanine dye dissolved in 10 ml of a diacetone alcohol solvent, was coated by spin coating to form a light absorptive layer 2 having a thickness of 0.10 μm. The complex refractive index of this light absorptive layer 2 was $n_{abs}=2.75$ and $k_{abs}=0.08$, and $\rho=n_{abs}d_{abs}/\lambda=0.35$.

An aluminum film having a thickness of 500 Å was formed by sputtering on the entire surface of this disc to form a light reflective layer 3. The complex refractive index of this light reflective layer 3 was $n_{ref}=1.87$ and $k_{ref}=7.0$. Further, on this light reflective layer 3, an ultraviolet curable resin was spin-coated and cured by irradiation with ultraviolet rays to form a protective layer 4 having a thickness of 10 μm.

To the optical disc thus obtained, FEM signals were recorded in the same manner as in Example 1. Then, this optical disc was played back by the same CD player as used in Example 1, whereby the reflectance of the optical disc was 72%, $I_{11}/I_{top}$ was 0.61, and $I_3/I_{top}$ was 0.31. Thus, the optical disc of this Example meets the CD standards like the preceding Examples.

EXAMPLE 7

On the light transmitting substrate 1 as used in Example 1, 0.65 g of 1,1'-dipropyl-3,3,3',3'-tetramethyl-5,5'-bis(1-phenyl-2-ethylene)dicarbocyanine toluene sulfonate as a cyanine dye dissolved in 10 ml of an isopropyl alcohol solvent, was coated by spin coating to form a light absorptive layer 2 having a thickness of 0.13 μm. The complex refractive index of this light absorptive layer 2 was $n_{abs}=2.7$ and $k_{abs}=0.04$, and $\rho=n_{abs}d_{abs}/\lambda=0.45$.

An silver film having a thickness of 600 Å was formed by sputtering on the entire surface of this disc to form a light reflective layer 3. The complex refractive index of this light reflective layer 3 was $n_{ref}=0.086$ and $k_{ref}=5.29$. Further, on this light reflective layer 3, an ultraviolet curable resin was spin-coated and cured by irradiation with ultraviolet rays to form a protective layer 4 having a thickness of 10 μm.

To the optical disc thus obtained, FEM signals were recorded in the same manner as in Example 1. Then, this optical disc was played back by the same CD player as used in Example 1, whereby the reflectance of the optical disc was 72%, $I_{11}/I_{top}$ was 0.62, and $I_3/I_{top}$ was 0.33. Thus, the optical disc of this Example meets the CD standards like the preceding Examples.

COMPARATIVE EXAMPLE 4

On a polycarbonate substrate 1 molded in the same manner as in Example 1, 0.35 g of the same organic dye as used in Example 1 dissolved in 10 ml of a diacetone alcohol solvent, was coated by spin coating to form a light absorptive layer 2 having a thickness of 0.065 μm. The optical parameter $\rho$ of this light absorptive layer 2 was $\rho=n_{abs}d_{abs}/\lambda=0.21$.

To this disc without forming the light reflective layer 3 or the protective layer 4, EFM signals were recorded in the same manner as in Example 1. Then, this optical disc was played back by the same CD player as used in Example 1, whereby $I_{11}/I_{top}$ was 0.70 and $I_3/I_{top}$ was 0.40, but the reflectance was as low as 43%. This optical disc does not meet the CD standards.

EXAMPLE 8

On the same light transmitting substrate 1 as used in Example 1, a silicone coating agent was spin-coated in a thickness of about 20 nm for solvent resistant treatment. Then, as an organic dye to form the light absorptive layer 2, 8.5 g of of a soluble phthalocyanine represented by the following chemical formula was dissolved in 10 ml of a dimethylformamide solvent,

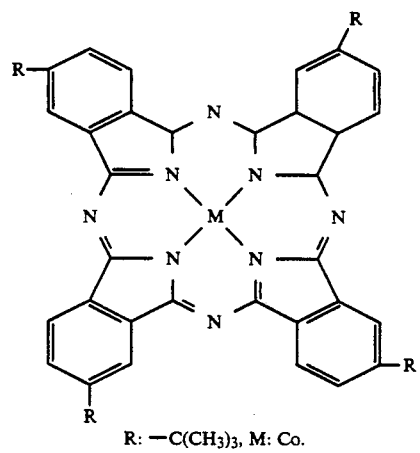

R: —C(CH₃)₃, M: Co.

The solution was coated by spin coating on the above substrate 1 to form a light absorptive layer 2 made of a dye film having a thickness of 160 nm. The complex refractive index of this light absorptive layer 2 was $n_{abs}=1.9$ and $k_{abs}=0.05$. Thus, $\rho=0.38$. The peak value of the thermal decomposition temperature was 400° C. as measured by the temperature gradient of 20° C./min in a nitrogen gas by using TG8110 colorimeter (DTA) manufactured by Rigaku Denki K.K. with respect to the material of this optical absorptive layer 2.

Further, a gold film having a thickness of 50 nm was formed by sputtering on the entire surface of this disc to form a light reflective layer 3. Further, on this light reflective layer 3, an ultraviolet curable resin was spin coated and cured by irradiation with ultraviolet rays to form a protective layer 4 having a thickness of 10 μm.

To the optical disc thus obtained, a semiconductor laser beam having a wavelength of 780 nm was irradiated at a linear speed of 1.2 m/sec with a recording power of 6.0 mW to record FEM signals. Then, this optical disc was played back by the same CD player as used in Example 1, whereby the reflectance of the optical disc was 73%, and $I_{11}/I_{top}$ obtained by the eye pattern was 0.63, and $I_3/I_{top}$ was 0.35. Thus, the optical disc of this Example meets the CD standards like the preceding Examples.

EXAMPLE 9

An optical disc was prepared in the same manner as in Example 8 except that in Example 8, an epoxy resin disc having a pregroove formed on the surface by a photo polymer method (photo polymerization method) was used as the light transmitting substrate 1, 5.0 g of Cr-bis-1(2-hydroxyphenyl)azo-2-hydroxynaphthalene (Oil Black HBB, manufactured by Orient Kagaku K.K.)

dissolved in 10 ml of dichloroethane was spin-coated directly on the disc without coating the silicon coating agent, to form a light absorptive layer 2 having a thickness of 150 nm, and a light reflective layer made of a thin film of an alloy of gold and iridium in a ratio of 9:1 was formed as the light reflective layer 3. The real part $n_{abs}$ of the complex refractive index of the light absorptive layer 2 in this optical disc was 2.05, and the imaginary part $k_{abs}$ thereof was 0.02. Thus, $\rho = 0.39$. Further the peak value of the thermal decomposition temperature of the material constituting the light absorptive layer 2, was 260° C.

To the optical disc thus obtained, EFM signals were recorded in the same manner as in Example 1. Then, this optical disc was played back by the same CD player as used in Example 1, whereby the reflectance was 80%, and $I_{11}/I_{top}$ obtainable by the eye pattern of the read-out signals, is 0.62, and $I_3/I_{top}$ was 0.33.

EXAMPLE 10

An optical disc was prepared in the same manner as in Example 8 except that in Example 8, instead of the silicone coating agent, a SiN layer having a thickness of 30 nm was formed on the light transmitting substrate 1 by a reactive sputtering with nitrogen gas, and 6.5 g of 3,3'-(2-acetoxyethyl)-10-diphenylamino-9,11-ethylenethiadicarbocyanine perchlorate dissolved in 10 ml of an acetyl acetone solvent, was spin-coated thereon to form a light absorptive layer 2 having a thickness of 130 nm. The real part $n_{abs}$ of the complex refractive index of the light absorptive layer 2 of this optical disc was 2.4, and the imaginary part $k_{abs}$ thereof was 0.06. Thus, $\rho = 0.40$. The peak value of the thermal decomposition temperature of the material of the above light absorptive layer 2 was 240° C.

To the optical disc thus obtained, EFM signals were recorded in the same manner as in Example 1. Then, this optical disc was played back by the same CD player as used in Example 1, whereby the reflectance was 78%, and $I_{11}/I_{top}$ obtainable from the eye pattern of the read-out signals was 0.61, and $I_3/I_{top}$ was 0.32.

EXAMPLE 11

An optical disc was prepared in the same manner as in Example 8 except that in Example 8, instead of the silicone coating agent, a polystyrene resin layer having a thickness of 60 nm was formed by spin coating on the light transmitting substrate 1, further a SiO$_2$ layer having a thickness of 30 nm was formed thereon by sputtering, then, 7.0 g of 3,3'-di-(3-acetoxypropyl)-5,6,5',6'-tetramethoxythiadicarbocyanine toluene sulfonate dissolved in 10 ml of a hydroxyacetone solvent was spin-coated thereon to form a light absorptive layer having a thickness of 140 nm, the light reflective layer 3 was formed directly on this light absorptive layer 2 by vacuum vapor deposition, and the thickness of the bisphenol curable type epoxy resin was changed to 5 μm. The real part $n_{abs}$ of the complex refractive index of the light absorptive layer 2 of this optical disc was 2.35, and the imaginary part $k_{abs}$ thereof was 0.1. Thus, $\rho = 0.42$. The peak value of the heat decomposition temperature of the material of the light absorptive layer 2, was 285° C.

To the optical disc thus obtained, EFM signals were recorded in the same manner as in Example 1. Then, this optical disc was played back by the same CD player as used in Example 1, whereby the reflectance was 70%, and $I_{11}/I_{top}$ obtainable from the eye pattern of the read-out signals was 0.62, and $I_3/I_{top}$ was 0.33.

EXAMPLE 12

An optical disc was prepared in the same manner as in Example 8 except that in Example 8, instead of the silicone coating agent, a polyvinyl acetate layer having a thickness of 60 nm was formed by spin coating on the light transmitting substrate 1, then, 6.7 g of 1,1'-dibutyl-3,3,3',3'-tetramethyl-5,5'-diethoxyindodicarbocyanine perchlorate dissolved in 10 ml of a diacetone alcohol solvent, was spin-coated thereon to form a light absorptive layer 2 having a thickness of 35 nm and a light reflective layer 3 made of a gold film was formed thereon by vacuum vapor deposition. The real part $n_{abs}$ of the complex refractive index of the light absorptive layer 2 of this optical disc was 2.6, and the imaginary part $k_{abs}$ was 0.07. Thus, $\rho = 0.45$. The peak value Of the thermal decomposition temperature of the material for the optical absorptive layer 2, was 267° C.

To the optical disc thus obtained, EFM signals were recorded in the same manner as in Example 1. Then, this optical disc was played back by the same CD player as used in Example 1, whereby the reflectance was 78%, and $I_{11}/I_{top}$ obtainable from the eye pattern of the read-out signals was 0.64, and $I_3/I_{top}$ was 0.36.

EXAMPLE 13

An optical disc was prepared in the same manner as in Example 8 except that in Example 8, a glass substrate was used as the light transmitting substrate 1, then, 4.5 g of an organic dye represented by the following chemical formula dissolved in 10 ml of a tetrahydrofuran solvent, was spin-coated on the substrate 1 to form the light absorptive layer 2 having a thickness of 160 nm without coating a silicone coating agent,

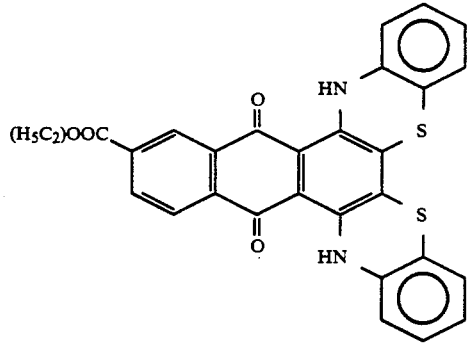

and polybutadiene was spin-coated on the light absorptive layer 2 in a thickness of 10 nm, and then a light reflective layer 3 made of a gold film was formed thereon by vacuum vapor deposition. The real part $n_{abs}$ of the complex refractive index of the light absorptive layer 2 of this optical disc was 1.82, and the imaginary part $k_{abs}$ was 0.04. Thus, $\rho = 0.37$. The peak value of the thermal decomposition temperature of the material for the light absorptive layer 2 was from 200° to 540° C.

To the optical disc thus obtained, EFM signals were recorded in the same manner as in Example 1. Then, this optical disc was played back by the same CD player as used in Example 1, whereby the reflectance was 75%, and $I_{11}/I_{top}$ obtainable from the eye pattern of the read-out signals was 0.62, and $I_3/I_{top}$ was 0.32.

EXAMPLE 14

An optical disc was prepared in the same manner as in Example 8 except that in Example 8, 8.8 g of an organic dye represented by the following chemical formula dissolved in 10 ml of a butanol solvent, was spin-coated to form a light absorptive layer 2 having a thickness of 65 nm on the light transmitting substrate 1 without coating the silicone coating agent, a SiO$_2$ layer having a thickness of 160 nm and a refractive index of 1.45 was provided between the light absorptive layer 2 and the light reflective layer 3, a light reflective layer 3 made of a gold film was formed by vacuum vapor deposition, and polybutadiene was coated in a thickness of 20 nm on the light reflective layer 3 to form a binding layer.

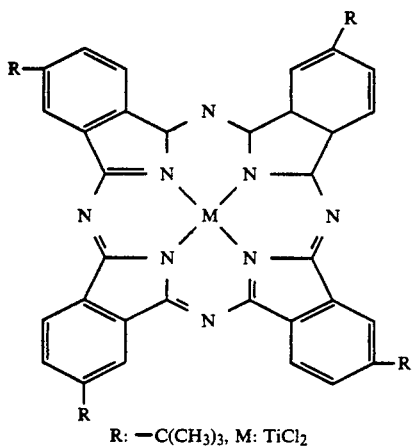

R: —C(CH$_3$)$_3$, M: TiCl$_2$

The real part n$_{abs}$ of the complex refractive index of the light absorptive layer 2 of this optical disc was 2.0, and the imaginary part k$_{abs}$ was 0.2. Thus, $\rho=0.46$. The peak value of the thermal decomposition temperature of the material for the above light absorptive layer 2, was from 300° to 400° C.

To the optical disc thus obtained, EFM signals were recorded in the same manner as in Example 1. Then, this optical disc was played back by the same CD player as used in Example 1, whereby the reflectance was 77%, and I$_{11}$/I$_{top}$ obtainable from the eye pattern of the read-out signals was 0.62, and I$_3$/I$_{top}$ was 0.32.

EXAMPLE 15

An optical disc was prepared in the same manner as in Example 8 except that in Example 8, as the light transmitting substrate 1, an epoxy resin disc having a pregroove formed on its surface by a photo polymerization method, was used, 5.0 g of Cr-bis-1-(2-hydroxyphenyl-)azo-2-hydroxynaphthalate (Oil Black HBB, manufactured by Orient Kagaku K.K.) dissolved in 10 ml of a dichloroethane solvent was spin coated on this disc directly without treatment for solvent resistance, to form a light absorptive layer 2 having a thickness of 150 nm, and a light reflective layer 3 made of a silver film was formed directly by vacuum vapor deposition as the light reflective layer 3. The real part n$_{abs}$ of the complex refractive index of the light absorptive layer 2 of this optical disc was 2.05, and the imaginary part k$_{abs}$ was 0.02. Thus, $\rho=0.39$. The peak value of the heat decomposition temperature of the material of the light absorptive layer 2 was 260° C.

To the optical disc thus obtained, EFM signals were recorded in the same manner as in Example 1. Then, this optical disc was played back by the same CD player as used in Example 1, whereby the reflectance was 80%, and I$_{11}$/I$_{top}$ obtainable from the eye pattern of the read-out signals was 0.64, and I$_3$/I$_{top}$ was 0.33.

EXAMPLE 16

An optical disc was prepared in the same manner as in Example 8 except that in Example 8, instead of the silicone coating agent, a silicone resin was spin-coated on the light transmitting substrate 1 in a thickness of 20 nm, then 6.5 g of 3,3'-(2-acetocyethyl)-10-diphenylamino-9,11-ethylenethiadicarbocyanine perchlorate dissolved in 10 ml of an acetylacetone solvent, was spin-coated thereon to form a light absorptive layer 2 having a thickness of 130 nm, and a light reflective layer 3 made of a film of an alloy of gold and iridium in a ratio of 9:1 was formed with a thickness of 50 nm directly on the light absorptive layer 2. The real part n$_{abs}$ of the complex refractive index of the light absorptive layer 2 of this optical disc was 2.4, and the imaginary part k$_{abs}$ was 0.06. Thus, $\rho=0.40$. The peak value of the thermal decomposition temperature of the material of the light absorptive layer 2 was 240° C.

To the optical disc thus obtained, EFM signals were recorded in the same manner as in Example 1. Then, this optical disc was played back by the same CD player as used in Example 1, whereby the reflectance was 78%, and I$_{11}$/I$_{top}$ obtainable from the eye pattern of the read-out signals was 0.62, and I$_3$/I$_{top}$ was 0.31.

EXAMPLE 17

An optical disc was prepared in the same manner as in Example 8 except that-in Example 8, no silicone coating agent was coated on the light transmitting substrate 1, 7.0 g of 3,3'-di-(3-acetoxypropyl)-5,6,5',6'-tetramethoxythiadicarbocyanine toluene sulfonate dissolved in 10 ml of a hydroxyacetone solvent, was spin-coated directly on the substrate 1 to form a light absorptive layer 2 having a thickness of 140 nm, a polysulfide-incorporated epoxy resin was coated on the light reflective layer 3 in a thickness of 20 nm, and the protective layer 4 was formed thereon. The real part n$_{abs}$ of the complex refractive index of the light absorptive layer 2 of this optical disc was 2.35, and the imaginary part k$_{abs}$ was 0.1. Thus, $\rho=0.42$. The peak value of the heat decomposition temperature of the material of the light absorptive layer 2 was 285° C.

To the optical disc thus obtained, EFM signals were recorded in the same manner as in Example 1. Then, this optical disc was played back by the same CD player as used in Example 1, whereby the reflectance was 70%, and I$_{11}$/I$_{top}$ obtainable from the eye pattern of the read-out signals was 0.63, and I$_3$/I$_{top}$ was 0.32.

EXAMPLE 18

An optical disc was prepared in the same manner as in Example 8 except that in Example 8, no silicone coating agent was coated on the light transmitting substrate 1, 6.7 g of 1,1'-dibutyl-3,3,3',3'-tetramethyl-5,5'-diethoxyindodicarbocyanine perchlorate dissolved in 10 m of a diacetone alcohol solvent, was spin-coated directly on the substrate 1 to form a light absorptive layer 2 having a thickness of 90 nm, and a ZnS film having a thickness of 50 nm and a refractive index of 2.31 was formed thereon by vacuum vapor deposition and the light reflective layer 3 was formed thereon. The real part n$_{abs}$ of the complex refractive index of the light absorptive layer 2 of this optical disc was 2.6, and the imaginary part $k_{abs}$ was 0.07. Thus, $\rho=0.42$. The peak value of the heat decomposition temperature of the material of the light absorptive layer 2 was 267° C.

To the optical disc thus obtained, EFM signals were recorded in the same manner as in Example 1. Then, this optical disc was played back by the same CD player as used in Example 1, whereby the reflectance was 82%, and $I_{11}/I_{top}$ obtainable from the eye pattern of the read-out signals was 0.62, and $I_3/I_{top}$ was 0.33.

EXAMPLE 19

An optical disc was prepared in the same manner as in Example 8 except that in Example 8, a glass substrate which was modified by the photo polymer method was used as the light transmitting substrate 1, then 4.5 g of an organic dye represented by the following chemical formula dissolved in 10 ml of a tetrahydrofuran solvent, was spin-coated directly on the substrate 1 without coating the silicone coating agent, to form a light absorptive layer 2 having a thickness of 80 nm, and a $SiO_2$ film having a thickness of 60 nm and a refractive index of 1.45 was formed thereon by sputtering and the light reflective layer 3 was formed thereon.

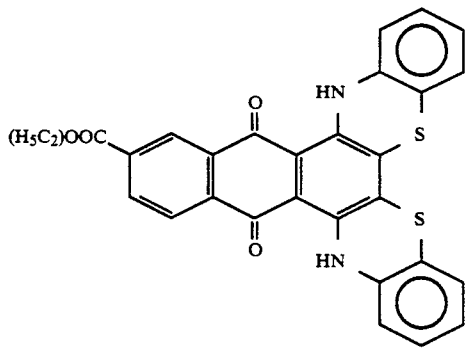

The real part $n_{abs}$ of the complex refractive index of the light absorptive layer 2 of this optical disc was 1.82, and the imaginary part $k_{abs}$ thereof was 0.04. Thus, $\rho=0.45$. The peak value of the heat decomposition temperature of the material of the light absorptive layer 2 was from 200° to 540° C.

To the optical disc thus obtained, EFM signals were recorded in the same manner as in Example 1. Then, this optical disc was played back by the same CD player as used in Example 1, whereby the reflectance was 78%, and $I_{11}/I_{top}$ obtainable from the eye pattern of the read-out signals was 0.62, and $I_3/I_{top}$ was 0.32.

COMPARATIVE EXAMPLE 5

An optical disc was prepared in the same manner as in Example 17 except that in Example 17, a solution of 8.0 g of an organic dye represented by the following chemical formula dissolved in 10 ml of an ethanol solvent, was spin-coated to form a light absorptive layer 2 having a thickness of 120 nm, and polybutadiene was spin-coated on the light absorptive layer 2 in a thickness of 10 nm and then a light reflective layer 3 of a gold film was formed thereon by vacuum vapor deposition.

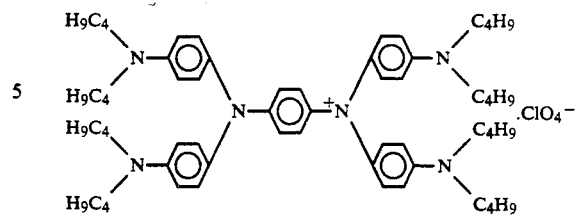

The real part $n_{abs}$ of the complex refractive index of the light absorptive layer 2 of this optical disc was 1.4, and the imaginary part $k_{abs}$ thereof was 0.12. Thus, $\rho=0.22$.

To the Optical disc thus obtained, EFM signals were recorded in the same manner as in Example 1. Then, this optical disc was played back by the same CD player as used in Example 1, whereby the reflectance was 58%, and $I_{11}/I_{top}$ obtainable from the eye pattern of the read-out signals was 0.64, and $I_3/I_{top}$ was 0.30. This optical disc does not meet the CD format with respect to the reflectivity.

COMPARATIVE EXAMPLE 6

An optical disc was prepared in the same manner as in Example 17 except that in Example 17, 6.7 g of 1,1'-diethyl-3,3,3',3'-tetramethylindotricarbocyanine perchlorate dissolved in 10 ml of an ethanol solvent, was spin coated to form a light absorptive layer 2 having a thickness of 120 nm, and a light reflective layer 3 made of a gold film was formed thereon by vacuum vapor deposition. The real part $n_{abs}$ of the complex refractive index of the light absorptive layer 2 of this optical disc was 2.6, and the imaginary part $k_{abs}$ thereof was 1.6. Thus, $\rho=0.40$.

To the optical disc thus obtainer, EFM signals were recorded in the same manner as in Example 1. Then, this optical disc was played back by the same CD player as used in Example 1, whereby the reflectance was as low as 19%, the eye pattern of the read-out signals was not clear, and $I_{11}/I_{top}$ and $I_3/I_{top}$ were not measurable from the eye pattern.

EXAMPLE 20

A polycarbonate disc (Panlite, tradename, manufactured by Tenjin Kasei K.K.) having a thickness of 1.2 mm, an outer diameter of 120 mm and an inner diameter of 15 mm and having a spiral pregroove 8 with a width of 0.8 μm, a depth of 0.08 μm and a pitch of 1.6 μm in a region covered by the diameter of from 46 to 117 mm of the disc, formed by injection molding, was used as the light transmitting substrate 1.

As an organic dye to form the light absorptive layer 2, 0.65 g of 1,1'-dibutyl-3,3,3',3'-tetramethyl-4,5,4',5'-dibenzoindodicarbocyanine perchlorate (product number NK3219, manufactured by Nippon Kanko Shikiso K.K.) was dissolved in 10 ml of a diacetone alcohol solvent. This solution was coated by spin coating on the surface of the substrate 1 to form a light absorptive layer 2 having a thickness of 130 nm.

Then, a silver film having a thickness of 50 nm was formed by sputtering over the entire surface of the region covered by the diameter of from 45 to 118 mm of this disc, to form a light reflective layer 3. The real part $n_{ref}$ of the complex refractive index of this light reflective layer 3 was 0.090 and the imaginary part $K_{ref}$ was 4.45. Thus, $\rho=0.45$. Further, on this light reflective layer 3, polybutadiene and silicone acrylate resin were spin-coated in thicknesses of 20 nm and 2 μm, respectively, and then an ultraviolet curable resin was spin-coated and cured by irradiation with ultraviolet rays to form a protective layer 4 having a thickness of 10 μm.

To the optical disc thus obtained, a semiconductor laser beam having a wavelength of 780 nm was irradiated at a linear speed of 1.2 m/sec with a recording power of 6.0 mW to record EFM signals. Then, this optical disc was played back by a commercially available CD player (Aurex XR-V73, wavelength of the reading laser beam $\lambda=780$ nm), whereby the reflectance of the laser beam was 74%, and $I_{11}/I_{top}$ obtainable from the eye pattern of the read-out signals was 0.64, and $I_3/I_{top}$ was 0.35.

The CD standards prescribe that the reflectance of the laser beam is at least 70%, $I_{11}/I_{top}$ is at least 0.6, and $I_3/I_{top}$ is from 0.3 to 0.7. Thus, the optical disc of this example meets the standards.

EXAMPLE 21

An optical disc was prepared in the same manner as in Example 20 except that in Example 20, a polycarbonate disc (Iupilon, tradename, manufactured by Mitsubishi Gas Kagaku K.K.) having a thickness of 1.2 mm, an outer diameter of 120 mm and an inner diameter of 15 mm and having a spiral prepit 8 for CD format signals formed with a width of 0.6 μm, a depth of 0.08 μm and a pitch of 1.6 μm in a range of a diameter of from 46 to 80 mm of the disc and a spiral pregroove 9 formed outside thereof with a width of 0.8 μm, a depth of 0.08 μm and a pitch of 1.6 μm in a range of the diameter of from 80 to 117 mm of the disc, which was formed by injection molding, was used as the light transmitting substrate 1, a gold film was formed as the light reflective layer 3, and only an epoxy resin layer having a thickness of 2 μm was formed by spin coating between this light reflective layer 3 and the protective layer 4 made of the ultraviolet curable resin. The real part $n_{ref}$ of the complex refractive index of the light reflective layer 3 of this optical disc was 0.16, and the imaginary part $k_{ref}$ was 4.84. Thus, $\rho=0.45$. The inside range of the diameter of from 46 to 80 mm of this optical disc is a so-called ROM (read only memory) region, and the outside range of the diameter of from 80 to 117 mm is a recordable region.

To the recordable region of the optical disc thus obtained, EFM signals were recorded in the same manner as in Example 20. Then, this optical disc was played back by the commercially available CD player, whereby the reflectance of the laser beam was 74%, and $I_{11}/I_{top}$ obtainable from the eye pattern of the read-out signals was 0.64, and $I_3/I_{top}$ was 0.34.

EXAMPLE 22

An optical disc was prepared in the same manner as in Example 20 except that in Example 20, a polystyrene disc was used as the light transmitting substrate 1, the pregroove on the disc was subjected to Webling of 22.11 kHz with an amplitude of 30 nm, the thickness of the absorptive layer was 90 nm, an acrylate resin layer having a refractive index of 1.48 and an epoxy resin layer were formed by spin coating in thicknesses of 40 nm and 10 nm, respectively, between the light absorptive layer 2 and the light reflective layer 3, an aluminum film was formed as the light reflective layer 3 having a thickness of 50 nm, and a protective layer 4 was formed on the light reflective layer 3 without interposition of a resin layer. The real part $n_{ref}$ of the complex refractive index of the light reflective layer 3 of this optical disc was 1.99, and the imaginary part $k_{ref}$ was 7.05. Thus, $\rho=0.39$.

To the optical disc thus obtained, EFM signals were recorded in the same manner as in Example 20. Then, this optical disc was played back by the commercially available CD player, whereby the reflectance of the laser beam was 70%, and $I_{11}/I_{top}$ obtainable from the eye pattern of the read-out signals was 0.62, and $I_3/I_{top}$ was 0.31.

EXAMPLE 23

An optical disc was prepared in the same manner as in Example 20 except that in Example 20, a polystyrene disc was used as the light transmitting substrate 1, a copper film was formed as the light reflective layer 3, only a polyester layer having a thickness of 2 μm was formed by spin coating between this light reflective layer 3 and the protective layer 4 made of the ultraviolet curable resin. The real part $n_{ref}$ of the complex refractive index of the light reflective layer 3 of this optical disc was 0.12, and the imaginary part $k_{ref}$ was 5.07.

To the Optical disc thus obtained, EFM signals were recorded in the same manner as in Example 20. Then, this optical disc was played back by the commercially available CD player, whereby the reflectance of the laser beam was 74%, and $I_{11}/I_{top}$ obtainable from the eye pattern of the read-out signals was 0.64, and $I_3/I_{top}$ was 0.32.

EXAMPLE 24

An optical disc was prepared in the same manner as in Example 20 except that in Example 20, a polyolefin disc (manufactured by Mitsui Petrochemical Co. Ltd.) was used as the light transmitting substrate 1, the light absorptive layer 2 having a thickness of 90 nm was formed with 1,1'-dibutyl-3,3,3',3'-tetramethyl-5,5'-diethoxyindodicarbocyanine perchlorate, an acryl resin layer and a vinyl chloride layer were formed by spin coating in thicknesses of 40 nm and 10 nm, respectively, between the light absorptive layer 2 and the light reflective layer 3, a platinum film was formed as the light reflective layer 3, and the protective layer 4 was formed on the light reflective layer 3 without interposition of a resin layer. The real part $n_{ref}$ of the complex refractive index of the light reflective layer 3 of this optical disc was 1.61, and the imaginary part $k_{ref}$ was 4.10. Thus, $\rho=0.38$.

To the optical disc thus obtained, EFM signals were recorded in the same manner as in Example 20. Then, this optical disc was played back by the commercially available CD player, whereby the reflectance of the laser beam was 70%, and $I_{11}/I_{top}$ obtainable from the eye pattern of the read-out signals was 0.62, and $I_3/I_{top}$ was 0.33.

EXAMPLE 25

An optical disc was prepared in the same manner as in Example 20 except that in Example 20, an epoxy disc was used as the light transmitting substrate 1, the light absorptive layer 2 having a thickness of 130 nm was formed with 1,1'-dibutyl-3,3,3',3'-tetramethyl-5,5'-diethoxyindodicarbocyanine perchlorate, a film of an alloy of gold and iridium in a ratio of 9:1 was formed by sputtering as the light reflective layer 3, and only a urethane resin layer having a thickness of 20 nm was formed by spin coating between the light reflective layer 3 and the protective layer 4. The real part $n_{ref}$ of the complex refractive index of the light reflective layer 3 of this optical disc was 0.46, and the imaginary part $k_{ref}$ was 5.0. Thus, $\rho=0.44$.

To the optical disc thus obtained, EFM signals were recorded in the same manner as in Example 20. Then, this optical disc was played back by the commercially available CD player, whereby the reflectance of the laser beam was 70%, and $I_{11}/I_{top}$ obtainable from the eye pattern of the read-out signals was 0.61, and $I_{11}/I_{top}$ was 0.31.

EXAMPLE 26

An optical disc was prepared in the same manner as in Example 20 except that in Example 20, a polymethyl methacrylate disc (Acrypet, tradename, manufactured by Mitsubishi Rayon Co., Ltd.) was used as the light was formed with 1,1'-dibutyl-3,3,3',3'-tetramethyl-5,5'-diethoxyindodicarbocyanine perchlorate, and a film of an alloy of gold and rhodium in a ratio of 9:1 was formed by sputtering as the light reflective layer 3, and only an isocyanate layer having a thickness of 20 nm was formed by spin coating between this light reflective layer 3 and the protective layer 4 made of the ultraviolet curable resin. The real part $n_{ref}$ of the complex refractive index of the light reflective layer 3 of this optical disc was 0.34, and the imaginary part $k_{ref}$ was 4.97. Thus, $\rho=0.44$.

To the Optical disc thus obtained, EFM signals were recorded in the same manner as in Example 20. Then, this optical disc was played back by the commercially available CD player, whereby the reflectance of the laser beam was 72%, and $I_{11}/I_{top}$ obtainable from the eye pattern of the read-out signals was 0.62, and $I_3/I_{top}$ was 0.32.

EXAMPLE 27

An optical disc was prepared in the same manner as in Example 20 except that in Example 20, a polymethyl methacrylate disc (PARAPET, tradename, manufactured by Kyowa Gas Kagaku K.K.) was used as the light transmitting substrate 1, the light absorptive layer 2 having a thickness of 80 nm was formed with 1,1'-dibutyl-3,3,3',3'-tetramethyl-5,5'-diethoxyindodicarbocyanine perchlorate, a $SiO_2$ layer having a thickness of 40 nm and a refractive index of 1.45 was formed by sputtering between the light absorptive layer 2 and light reflective layer 3, a film of an alloy of gold and antimony in a ratio of 8:2 was formed by sputtering as the light reflective layer 3, and only a polyisoprene layer having a thickness of 20 nm was formed by spin coating between this light reflective layer 3 and the protective layer 4 made of the ultraviolet curable resin. The real part $n_{ref}$ of the complex refractive index of the light reflective layer 3 of this optical disc was 0.93, and the imaginary part $k_{ref}$ was 4.72. Thus, $\rho=0.35$.

To the optical disc thus obtained, EFM signals were recorded in the same manner as in Example 20. Then, this optical disc was played back by the commercially available CD player, whereby the reflectance of the laser beam was 72%, and $I_{11}/I_{top}$ obtainable from the eye pattern of the read out signals was 0.63, and $I_3/I_{top}$ was 0.34.

EXAMPLE 28

An optical disc was prepared in the same manner as in Example 20 except that in Example 20, the light absorptive layer 2 having a thickness of 130 nm was formed with 1,1'-dibutyl-3,3,3',3'-tetramethyl-5,5'-diethoxyindodicarbocyanine perchlorate, a gold film was formed as the light reflective layer 3, and the protective layer 4 was formed on the light reflective layer 3 without interposition of a resin layer. The real part $n_{ref}$ of the complex refractive index of the light reflective layer 3 of this optical disc was 0.16, and the imaginary part $k_{ref}$ was 4.84. Thus, $\rho=0.44$.

To the optical disc thus obtained, EFM signals were recorded in the same manner as in Example 20. Then, this optical disc was played back by the commercially available CD player, whereby the reflectance of the laser beam was 74%, and $I_{11}/I_{top}$ obtainable from the eye pattern of the read-out signals was 0.64, and $I_3/I_{top}$ was 0.35.

COMPARATIVE EXAMPLE 7

An optical disc was prepared in the same manner as in Example 20 except that in Example 20, a polycarbonate disc having a thickness of 1.2 mm, an outer diameter of 120 mm and an inner diameter of 15 mm and having a spiral prepit 8 for CD formt signals formed with a width of 0.6 μm, a depth of 0.08 μm and a pitch of 1.6 μm in a range of the diameter of from 46 to 80 mm of the disc and a spiral pregroove 9 formed outside thereof with a width of 0.8 μm, a depth of 0.08 μm and a pitch of 1.6 μm in a range of the diameter of from 80 to 117 mm of the disc, which was formed by injection molding, was used as the light transmitting substrate 1, and a chromium film was formed as the light reflective layer 3, and only an epoxy resin layer having a thickness of 2 μm was formed by spin coating between this light reflective layer 3 and the protective layer 4 made of the ultraviolet curable resin. The real part $n_{ref}$ of the complex refractive index of the light reflective layer 3 of this optical disc was 3.1, and the imaginary part $k_{ref}$ was 3.0. Thus, $\rho=0.45$. The inside range of the diameter of from 46 to 80 mm of this optical disc is a so-called ROM (read only memory) region, and the outside range of the diameter of from 80 to 117 mm is a recordable region. To the recordable region of the optical disc thus obtained, EFM signals were recorded in the same manner as in Example 20. Then, this optical disc was played back by the commercially available CD player, whereby the reflectance of the laser beam was 39%, and $I_{11}/I_{top}$ obtainable from the eye pattern of the read-out signals was 0.55, and $I_3/I_{top}$ was 0.28.

EXAMPLE 29

A polycarbonate substrate 1 of a disc shape having a thickness of 1.2 mm, an outer diameter of 120 mm and an inner diameter of 15 mm and having a spiral pregroove formed with a width of 0.8 μm, a depth of 0.08 μm and a pitch of 16 μm, was molded by injection molding.

5.0 g of 1,1'-dibutyl-3,3,3',3'-tetramethyl-5,5'-diethoxyindodicarbocyanine perchlorate was dissolved in 10 ml of a hydroxyacetone solvent. This solution was coated by spin coating on the substrate 1 to form a light absorptive layer 2 having a thickness of $d_{abs}$ of 70 nm. The real part $n_{abs}$ of the complex refractive index of the light absorptive layer 2 was 0.65, and the imaginary part $k_{abs}$ was 0.04.

Further, on this light absorptive layer 2, a $SiO_2$ film having a thickness $d_{ehs}$ of 50 nm was formed by sputtering as the enhancing layer 16. A reflective layer 3 made of a film of an alloy of gold and titanium in a ratio of 9:1 having thickness of 50 nm was formed thereon by vacuum vapor deposition. The real part of $n_{ehs}$ of the complex refractive index of the enhancing layer 16 was 1.45. Accordingly, $\rho=0.33$.

Then, an ultraviolet curable resin was spin-coated on the above light reflective layer 3 and cured by irradiation with ultraviolet rays to form a protective layer 4 having a thickness of 10 μm.

To the optical disc thus obtained, a semiconductor laser beam having a wavelength of 780 nm was irradiated at a linear speed of 1.2 m/sec with a recording power of 6.0 mW to record EFM signals. Then, this optical disc was played back by a commercially available CD player (Aurex XR-V73, wavelength of the reading laser beam $\lambda=780$ nm), whereby the reflectance of the optical disc was 79%, and a satisfactory eye pattern was obtained.

EXAMPLE 30

An optical disc was prepared in the same manner as in Example 29 except that in Example 29, an AlN layer having a thickness $d_{ehs}$ of 40 nm was formed as the enhancing layer 16, and the protective layer 4 was formed on the light reflective layer 3 with an epoxy resin layer having a thickness of 15 nm interposed therebetween. The real part $n_{ehs}$ of the complex refractive index of the enhancing layer 16 of this optical disc was 2.2. Thus, $\rho=0.35$.

To the optical disc thus obtained, EFM signals were recorded in the same manner as in Example 29. Then, this optical disc was played back by the commercially available CD player, whereby the reflectance was 75%, and a satisfactory eye pattern was obtained.

EXAMPLE 31

An optical disc was prepared in the same manner as in Example 29 except that in Example 29, an amorphous SiO layer having a thickness $d_{ehs}$ of 40 nm was formed by reactive sputtering in oxygen as the enhancing layer 16, and the light reflective layer 3 was formed with a film of an alloy of gold and antimony in a ratio of 9:1, and the protective layer 4 was formed on the light reflective layer 3 with a polyvinyl acetate layer of a thickness of 15 nm interposed therebetween. The real part $n_{ehs}$ of the complex refractive index of the enhancing layer 16 of this optical disc was 1.98. Thus, $\rho=0.34$.

To the optical disc thus obtained, EFM signals were recorded in the same manner as in Example 29. Then, this optical disc was played back by the commercially available CD player, whereby the reflectance was 75%, and a satisfactory eye pattern was obtained.

EXAMPLE 32

An optical disc was prepared in the same manner as in Example 29 except that in Example 29, a $Si_3N_4$ layer having a thickness $d_{ehs}$ of 45 nm was formed by reactive sputtering in nitrogen as the enhancing layer 16, and the light reflective layer 3 was formed with a film of an alloy of gold and antimony in a ratio of 9:1. The real part $n_{ehs}$ of the complex refractive index of the enhancing layer 16 of this optical disc was 1.85. Thus, $\rho=0.34$.

To the optical disc thus obtained, EFM signals were recorded in the same manner as in Example 29. Then, this optical disc was played back by the commercially available CD player, whereby the reflectance was 76%, and a satisfactory eye pattern was obtained.

EXAMPLE 33

An optical disc was prepared in the same manner as in Example 29 except that in Example 29, a ZnS layer having a thickness $d_{ehs}$ of 30 nm was formed by sputtering as the enhancing layer 16, and a light reflective layer 3 made of a gold film was formed by sputtering. The real part $n_{ehs}$ of the complex refractive index of the enhancing layer 16 of this optical disc was 2.31. Thus, $\rho=0.33$.

To the optical disc thus obtained, EFM signals were recorded in the same manner as in Example 29. Then, this optical disc was played back by the commercially available CD player, whereby the reflectance was 80%, and a satisfactory eye pattern was obtained.

EXAMPLE 34

5.5 g of 1,1'-dibutyl-3,3,3',3'-tetramethyl-4,5,4',5'-dibenzoindodicarbocyanine perchlorate (product number NK3219, manufactured by Nippon Kanko Shikiso Kenkyusho) was dissoved in 10 ml of diacetone alcohol. The solution was spin-coated on the substrate 1 molded in the same manner as in Example 29, to form a light absorptive layer 2 having a thickness $d_{abs}$ of 90 nm. The real part $n_{abs}$ of the complex refractive index of this light absorptive layer 2 was 2.7, and the imaginary part $k_{abs}$ thereof was 0.05.

Further, on this light absorptive layer 2, a $SiO_2$ film having a thickness $d_{ehs}$ of 50 nm was formed by sputtering as an enhancing layer 6. A reflective layer 3 made of a gold film having a thickness of 50 nm was formed by sputtering thereon. The real part $n_{ehs}$ of the complex refractive index of the enhancing layer 6 was 1.45. Thus, $\rho=0.40$.

Then, an isocyanate curable type epoxy resin was spin-coated on the light reflective layer 3 and heat-cured to form a protective layer 4 having a thickness of 5 μm.

To the optical disc thus obtained, EFM signals were recorded in the same manner as in Example 29. Then, this optical disc was played back by the commercially available CD player, whereby the reflectance was 82%, and a satisfactory eye pattern was obtained.

EXAMPLE 35

An optical disc was prepared in the same manner as in Example 34 except that in Example 34, an AlN layer having a thickness $d_{ehs}$ of 60 nm was formed as the enhancing layer 16, a polybutadiene layer having a thickness of 15 nm was interposed between the light reflective layer 3 and the protective layer 4, and the protective layer was formed with a ultraviolet curable resin in a thickness of 10 μm. The real part $n_{ehs}$ of the complex refractive index of the enhancing layer 16 of this optical disc was 2.2. Thus, $\rho=0.42$.

To the optical disc thus obtained, EFM signals were recorded in the same manner as in Example 29. Then, this optical disc was played back by the commercially available CD player, whereby the reflectance was 82%, and a satisfactory eye pattern was obtained.

EXAMPLE 36

An optical disc was prepared in the same manner as in Example 34 except that in Example 34, an amorphous SiO layer having a thickness $d_{ehs}$ of 40 nm was formed by reactive sputtering in oxygen as the enhancing layer 16, the light reflective layer 3 was formed by vacuum vapor deposition, and the protective layer 4 was formed with a ultraviolet curable resin in a thickness of 10 μm. The real part $n_{ehs}$ of the complex refractive index of the enhancing layer 16 of this optical disc was 1.98. Thus, $\rho=0.41$.

To the optical disc thus obtained, EFM signals were recorded in the same manner as in Example 29. Then, this optical disc was played back by the commercially available CD player, whereby the reflectance was 82%, and a satisfactory eye pattern was obtained.

EXAMPLE 37

An optical disc was prepared in the same manner as in Example 34 except that in Example 34, an acrylate resin layer having a thickness of 60 nm was formed on the light transmitting substrate 1, the light absorptive layer 2 was formed thereon, a silicone resin layer having a thickness $d_{ehs}$ of 45 nm was formed by spin coating as the enhancing layer 16, the light reflective layer 3 was formed by vacuum vapor deposition, and the protective layer 4 was formed with a ultraviolet curable resin in a thickness of 10 μm. The real part $n_{ehs}$ of the complex refractive index of the enhancing layer 16 of the optical disc was 1.47. Thus, $\rho = 0.40$.

To the optical disc thus obtained, EFM signals were recorded in the same manner as in Example 29. Then, this optical disc was played back by the commercially available CD player, whereby the reflectance was 82%, and a satisfactory eye pattern was obtained.

EXAMPLE 38

An optical disc was prepared in the same manner as in Example 34 except that in Example 34, a ZnS layer having a thickness $d_{ehs}$ of 20 nm was formed as the enhancing layer 16, a thin film of an alloy of gold and iridium in a ratio of 9:1 was formed by vacuum vapor deposition as the light reflective layer 3, and the protective layer 4 was formed with a ultraviolet curable resin in a thickness of 10 μm. The real part $n_{ehs}$ of the complex refractive index of the enhancing layer 16 of this optical disc was 2.31. Thus, $\rho = 0.37$.

To the optical disc thus obtained, EFM signals were recorded in the same manner as in Example 29. Then, this optical disc was played back by the commercially available CD player, whereby the reflectance was 73%, and a satisfactory eye pattern was obtained.

EXAMPLE 39

An optical disc was prepared in the same manner as in Example 34 except that in Example 34, an ultraviolet curable resin layer having a thickness of 20 nm was formed on the light transmitting substrate 1, the light absorptive layer 2 was formed thereon, a SiN layer having a thickness of $d_{ehs}$ of 35 nm was formed as the enhancing layer 16, a thin film of an alloy of gold and iridium in a ratio of 9:1 was formed by vacuum vapor deposition as the light reflective layer 3, and the protective layer 4 was formed with a ultraviolet curable resin in a thickness of 10 μm. The real part $n_{ehs}$ of the complex refractive index of the enhancing layer 16 of this optical disc was 1.82. Thus, $\rho = 0.39$.

To the optical disc thus obtained, EFM signals were recorded in the same manner as in Example 29. Then, this optical disc was played back by the commercially available CD player, whereby the reflectance was 76%, and a satisfactory eye pattern was obtained.

EXAMPLE 40

A polycarbonate disc having a thickness of 1.2 mm, an outer diameter of 120 mm and an inner diameter of 15 mm and having a spiral pregroove 8 formed with a width of 0.8 μm, a depth of 0.08 μm and a pitch of 1.6 μm in a range of the diameter of from 46 to 117 mm, which was formed by injection molding, was used as the light transmitting substrate 1.

An ultraviolet curable resin was spin-coated on this light transmitting substrate 1 and cured by ultraviolet rays to form a solvent resistant layer 6 having a thickness of 20 nm. Then, as an organic dye to form a light absorptive layer 2 thereon, 0.65 g of 1,1'-diethyl-3,3,3',3'-tetramethyl-5,5'-dimethoxyindodicarbocyanine perchlorate was dissolved in 10 ml of an acetonitrile solvent. The solution was coated by spin coating on the surface of the substrate 1 to form a light absorptive layer 2 having a thickness of 130 nm. Thus, $\rho = 0.44$.

Then, a film of an alloy of gold and titanium in a ratio of 9:1 having a thickness of 50 nm was formed by vacuum vapor deposition on the entire surface in a region of the diameter of from 45 to 118 mm of this disc, to form a light reflective layer 3. Further, on this light reflective layer 3, an ultraviolet curable resin was rays to form a protective layer having a thickness of 10 μm.

To the optical disc thus obtained, a semiconductor laser beam having a wavelength of 780 nm was irradiated at a linear speed of 1.2 m/sec with a recording power of 6.0 mW to record EFM signals. Then, this optical disc was played back by a commercially available CD player (Aurex XR-V73, wavelength of the reading laser beam λ=780 nm), whereby the reflectance of the laser beam was 74%, a satisfactory eye pattern was obtained, and the block error rate of the read-out signals was $2.5 \times 10^{-3}$.

EXAMPLE 41

An optical disc was prepared in the same manner as in Example 40 except that in Example 40, an epoxy resin was used for the solvent resistant layer 6, 1,4-dioxane was used as the solvent for the light absorptive layer 2, and an epoxy resin layer having a thickness of 10 nm was interposed between the light absorptive layer 2 and the light reflective layer 3.

To the optical disc thus obtained, EFM signals were recorded in the same manner as in Example 42. Then, this optical disc was played back by the commercially available CD player, whereby the reflectance of the laser beam was 72%, a satisfactory eye pattern was obtained, and the block error rate of the read-out signals was $2.7 \times 10^{-3}$.

EXAMPLE 42

An optical disc was prepared in the same manner as in Example 40 except that in Example 40, a $SiO_2$ solvent resistant layer 6 was formed by a precipitation (LPD) method, 0.5 g of 1,1'-diethyl-3,3,3',3'-tetramethyl-5,5'-dimethoxyindodicarbocyanine perchlorate was dissolved in 15 ml of a methyl ethyl ketone solvent and the light absorptive layer 2 was formed therewith in a thickness of 90 nm. Thus, $\rho = 0.44$. A bisphenol curable type epoxy resin and a silicone coating agent were sequentially spin-coated in thicknesses of 10 nm and 60 nm, respectively, on the light absorptive layer 2, followed by curing, and a light reflective layer 3 made of a film of an alloy of gold and antimony in a ratio of 9:1, was formed thereon.

To the optical disc thus obtained, EFM signals were recorded in the same manner as in Example 40. Then, this optical disc was played back by the commercially available CD player, whereby the reflectance of the laser beam was 78%, a satisfactory eye pattern was obtained, and the block error rate of the read-out signals was $1.8 \times 10^{-3}$.

EXAMPLE 43

An optical disc was prepared in the same manner as in Example 40 except that in Example 40, the solvent resistant layer 6 was formed by sputtering $SiO_2$, 0.5 g of dimethoxyindodicarbocyanine perchlorate was dissolved in 10 ml of nitromethane solvent and a light absorptive layer 2 was formed therewith in a thickness of 90 nm. Thus, $\rho=0.45$. A silicone coating agent was coated on the light absorptive layer 2 in a thickness of 60 nm, and then a light reflective layer 3 made of a film of an alloy of gold and antimony in a ratio of 9:1, was formed thereon.

To the optical disc thus obtained, EFM signals were recorded in the same manner as in Example 40. Then, this optical disc was played back by the commercially available CD player, whereby the reflectance of the laser beam was 76%, a satisfactory eye pattern was obtained, and the block error rate of the read-out signals was $2.0 \times 10^{-3}$.

EXAMPLE 44

An optical disc was prepared in the same manner as in Example 40 except that in Example 40, an epoxy resin layer having a thickness of 40 nm was formed on the light transmitting substrate 1, then a silane coupling agent was coated thereon to form a solvent resistant layer 6, 0.65 g of 1,1'-diethyl-3,3,3',3'-tetramethyl-4,5,4',5'-dibenzoindodicarbocyanine perchlorate (product number NK3240, manufactured by Nippon Kanko Shikiso Kenkyusho) was dissolved in 10 ml of a 1,2'-dichloroethane solvent and spin-coated to form a light absorptive layer 2, polybutadiene was coated on the light absorptive layer 2 in a thickness of 10 nm. Thus, $\rho=0.45$. and then a light reflective layer 3 made of a gold film was formed thereon by sputtering.

To the optical disc thus obtained, EFM signals were recorded in the same manner as in Example 40. Then, this optical disc was played back by the commercially available CD player, whereby the reflectance of the laser beam was 73%, a satisfactory eye pattern was obtained, and the block error rate of the read-out signals was $2.4 \times 10^{-3}$.

EXAMPLE 45

An optical disc was prepared in the same manner as in Example 40 except that in Example 40, a titanate coupling agent was coated on the light transmitting substrate 1 to form a solvent resistant layer 6, 0.65 g of 1,1'-diethyl-3,3,3',3'-tetramethyl-4,5,4',5'-dibenzoindodicarbocyanine perchlorate (product number NK3240, manufactured by Nippon Kanko Shikiso Kenkyusho) was dissolved in 10 ml of a 2-nitropropane solvent and spin-coated to form a light absorptive layer 2, a light reflective layer 3 made of a gold film was formed by sputtering, and the protective layer 4 was made of an epoxy resin layer $\rho=0.45$.

To the optical disc thus obtained, EFM signals were recorded in the same manner as in Example 40. Then, this optical disc was played back by the commercially available CD player, whereby the reflectance of the laser beam was 74%, a satisfactory eye pattern was obtained, and the block error rate of the read-out signals was $3.5 \times 10^{-3}$.

EXAMPLE 46

An optical disc was prepared in the same manner as in Example 40 except that in Example 40, a silicone coating agent was coated on the light transmitting substrate 1 to form a solvent resistant layer 6, 0.65 g of 1,1'-diethyl-3,3,3',3'-tetramethyl-4,5,4',5'-dibenzoindodicarbocyanine perchlorate was dissolved in 10 ml of a cyclohexanone solvent and spin-coated to form a light absorptive layer 2, and a light reflective layer 3 made of a gold film was formed by sputtering.

To the optical disc thus obtained, EFM signals were recorded in the same manner as in Example 40. Then, this optical disc was played back by the commercially available CD player, whereby the reflectance of the laser beam was 74%, a satisfactory eye pattern was obtained, and the block error rate of the read-out signals was $7.2 \times 10^{-3}$. $\rho=0.45$.

EXAMPLE 47

An optical disc was prepared in the same manner as in Example 40 except that in Example 40, a silicone coating agent was coated on the transparent substrate 1 to form a solvent resistant layer 6, 0.65 g of 1,1'-diethyl-3,3,3',3'-tetramethyl-4,5,4',5'-dibenzoindodicarbocyanine perchlorate was dissolved in 10 ml of a chlorobenzene solvent and spin-coated to form a light absorptive layer 2, and a light reflective layer 3 made of a gold film was formed by vacuum vapor deposition.

To the optical disc thus obtained, EFM signals were recorded in the same manner as in Example 40. Then, this optical disc was played back by the commercially available CD player, whereby the reflectance of the laser beam was 73%, a satisfactory eye pattern was obtained, and the block error rate of the read-out signals was $6.9 \times 10^{-3}$. $\rho=0.45$.

EXAMPLE 48

An optical disc was prepared in the same manner as in Example 40 except that in Example 40, a silicone coating agent was coated on the light transmitting substrate 1 to form a solvent resistant layer 6, 0.65 g of 1,1'-diethyl-3,3,3',3'-tetramethyl-4,5,4',5'-dibenzoindodicarbocyanine perchlorate was dissolved in 10 ml of an o-dichlorobenzene solvent and spin-coated to form a light absorptive layer 2, and a polybutadiene layer having a thickness of 10 nm was interposed between the light absorptive layer and the light reflective layer 3.

To the optical disc thus obtained, EFM signals were recorded in the same manner as in Example 40. Then, this optical disc was played back by the commercially available CD player, whereby the reflectance of the laser beam was 73%, a satisfactory eye pattern was obtained, and the block error rate of the read-out signals was $1.0 \times 10^{-2}$. $\rho=0.45$.

Further, it was confirmed that the solvent resistant layers in Examples 40 to 48 were effective also against other solvents for dyes, including alcohols such as benzyl alcohol and furfuryl alcohol; ethers such as methyl carbitol, carbitol and tetrahydrofuran; ketones such as acetone, methylisobutyl ketone, acetophenone and acetylacetone; esters such as ethyl formate, butyl formate, amyl formate, methyl acetate, ethyl acetate, propyl acetate, butyl-acetate, amyl acetate, phenyl acetate, methyl cellosolve acetate and cellosolve acetate; nitrohydrocarbons such as nitroethane, nitrobutanol and nitrobenzene; chlorinated solvents such as methyl chloride, methylene chloride, chloroform, methyl bromide, bromoform, methylene iodide, ethyl chloride, ethylidene chloride, trichloroethane, trichloroethylene, propylene chloride, butyl chloride, dichlorobutane, hexachloropropylene, dichloropentane, amyl chloride, trichlorobenzene, chlorotoluene and dichlorotoluene; and others such as paraldehyde, crotonaldehyde, furfural, aldol, formamide, dimethylformamide, γ-valerolactone, amylphenol, sulforane, dimethylsulfoxide, N-methylpyrrolidone and methyl carbamate to prevent the surface layer of the light transmitting substrate 1 from being modified, or to prevent the prepit or pregroove formed on the light transmitting substrate 1 from being dissolved or deformed and thus to ensure that the reflectance of the laser beam and the degree of modulation of the read-out signals of the data satisfy the CD format.

COMPARATIVE EXAMPLE 8

An optical disc was prepared in the same manner as in Example 40 except that in Example 40, no solvent resistant layer 6 was formed on the light transmitting substrate 1, and 0.65 g of 1,1'-diethyl-3,3,3',3'-tetramethyl-5,5'-dimethoxyindodicarbocyanine perchlorate was dissolved in 10 ml of an acetonitrile solvent and directly spin coated to form a light absorptive layer 2.

To the optical disc thus obtained, EFM signals were recorded in the same manner as in Example 40. Then, this optical disc was played back by the commercially available CD player, whereby the reflectance of the laser beam was 65%, the waveform pattern of the read-out signals was not clear, the desired eye pattern was not obtained, and the block error rate of the read-out signals was $2.0 \times 10^{-1}$.

What is claimed is:

1. An optical information recording medium comprising a light transmitting substrate, a light absorptive layer having a complex refractive index comprised of a real part of said complex refractive index ($n_{abs}$) and an imaginary part of said complex refractive index ($k_{abs}$), said absorptive layer having a thickness ($d_{abs}$), said light absorptive layer overlaying the substrate to absorb a laser beam and a light reflective layer overlaying the light absorptive layer, wherein an optical parameter represented by $\rho = n_{abs}d_{abs}/\lambda$ where $\lambda$ is the wavelength of a reading laser beam, meets the inequality $0.05 \leq \rho \leq 0.6$, and the imaginary part $k_{abs}$ of the complex refractive index of the light absorptive layer is at most 0.3.

2. The optical information recording medium according to Claim 1, wherein the light absorptive layer comprises a cyanine dye, and the light reflective layer is made of a metal film.

3. The optical information recording medium according to claim 2, wherein the cyanine dye is indodicarbocyanine.

4. The optical information recording medium according to claim 1, wherein the light absorptive layer contains a material which, upon absorption of a laser beam by the light absorptive layer, undergoes a temperature rise and, at a temperature of from 100° to 600° C., undergoes an exothermic reaction with generation of a gas.

5. The optical information recording medium according to claim 1, wherein $n_{abs}$ is $n_{abs} \geq 1.8$, and $k_{abs}$ is $0.001 \leq k_{abs} \leq 0.3$.

6. The optical information recording medium according to claim 1, wherein the real part $n_{ref}$ of the complex refractive index of the light reflective layer and the imaginary part $k_{ref}$ of the complex refractive index of the light reflective layer satisfy a relation of $k_{ref} \geq 2n_{ref} + 0.8$.

7. The optical information recording medium according to claim 1, wherein an enhancing layer which is transparent to the wavelength of the reading laser beam is disposed between the light absorptive layer and the light reflective layer.

8. The optical information recording medium according to claim 7, wherein an optical parameter represented by $$\rho = \frac{n_{abs}d_{abs} + n_{ehs}d_{ehs}}{\lambda}$$

where $n_{abs}$, $d_{abs}$ and $\lambda$ are as defined above, $n_{ehs}$ is the real part of the complex refractive index of the enhancing layer and $d_{ehs}$ is the thickness of the enhancing layer, is $0.05 \leq \rho \leq 1.1$.

9. The optical information recording medium according to claim 1, wherein the substrate is provided with a solvent resistant layer to protect the substrate from a solvent used for formation of the light absorptive layer.

* * * * *